(12) United States Patent
Kemmochi et al.

(10) Patent No.: US 8,848,902 B2
(45) Date of Patent: Sep. 30, 2014

(54) HEADPHONE DEVICE

(75) Inventors: Chisato Kemmochi, Kanagawa (JP); Shiro Suzuki, Kanagawa (JP); Kyosuke Matsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 978 days.

(21) Appl. No.: 12/726,709

(22) Filed: Mar. 18, 2010

(65) Prior Publication Data
US 2010/0246807 A1   Sep. 30, 2010

(30) Foreign Application Priority Data

Mar. 31, 2009 (JP) ............................... P2009-086902

(51) Int. Cl.
| H04M 1/00 | (2006.01) |
| H04M 1/215 | (2006.01) |
| H04M 1/05 | (2006.01) |
| H04M 1/60 | (2006.01) |
| H04M 1/725 | (2006.01) |
| H04R 3/12 | (2006.01) |
| H04R 1/10 | (2006.01) |
| H04R 5/04 | (2006.01) |

(52) U.S. Cl.
CPC ............... *H04R 3/12* (2013.01); *H04M 1/2155* (2013.01); *H04M 1/05* (2013.01); *H04M 1/60* (2013.01); *H04M 1/72591* (2013.01); *H04R 2201/107* (2013.01); *H04R 5/04* (2013.01); *H04R 2420/01* (2013.01)
USPC ....................................... 379/428.02; 381/74

(58) Field of Classification Search
USPC ........ 379/428.02; 381/74, 370, 183, 309, 371
See application file for complete search history.

(56) References Cited

U.S. PATENT DOCUMENTS

| 2002/0168081 | A1* | 11/2002 | Sato .............................. 381/379 |
| 2005/0105755 | A1* | 5/2005 | Yueh ............................. 381/371 |
| 2005/0185813 | A1* | 8/2005 | Sinclair et al. ................ 381/380 |
| 2008/0089530 | A1* | 4/2008 | Bostick et al. .................. 381/74 |
| 2008/0192971 | A1* | 8/2008 | Tateno et al. ................. 381/328 |
| 2008/0247562 | A1* | 10/2008 | Nagayasu et al. .............. 381/74 |
| 2009/0196454 | A1* | 8/2009 | Her et al. ...................... 381/380 |
| 2010/0111337 | A1* | 5/2010 | Silber et al. ................... 381/309 |

FOREIGN PATENT DOCUMENTS

| CN | 101203059 A | 6/2008 |
| CN | 101227759 A | 7/2008 |
| JP | 3116881 | 11/2005 |

OTHER PUBLICATIONS

Notification of First Office Action, dated Aug. 31, 2012, in related Chinese Application No. 201010140263.4, (8 pages).

* cited by examiner

*Primary Examiner* — Fan Tsang
*Assistant Examiner* — Solomon Bezuayehu
(74) *Attorney, Agent, or Firm* — Finnegan, Henderson, Farabow, Garrett & Dunner, L.L.P.

(57) ABSTRACT

A headphone device includes: two output units for outputting playback audio which has been played back; a contact determination unit determining the occurrence of contact with respect to a telephone device; a first audio-collecting unit for collecting call voice generated from the telephone device; a second audio-collecting unit for collecting ambient external sound; and an output audio control unit performing control so that the call voice is outputted from one output unit of the two output units and the external sound is outputted from the other output unit when it is determined that contact has occurred by the contact determination unit.

15 Claims, 17 Drawing Sheets

FIG.5

| RESPONSE SENSITIVITY | DELAY DEVICE | | | | DETECTION RESULT INDEX | CONTACT-RESULT DECISION RESULT (THRESHOLD ± 0.5) |
|---|---|---|---|---|---|---|
| | $d_1$ | $d_2$ | $d_3$ | $d_4$ | | |
| | 1 | 1 | 0 | 0 | | |
| WEIGHTING FACTOR | $w_1$ | $w_2$ | $w_3$ | $w_4$ | | |
| HIGH SENSITIVITY | 0.70 | 0.20 | 0.10 | 0.00 | 0.90 | 1; CONTACT HAS OCCURRED (PRESSURE SENSOR 121 SIDE) |
| STANDARD SENSITIVITY | 0.25 | 0.25 | 0.25 | 0.25 | 0.50 | 1; CONTACT HAS OCCURRED (PRESSURE SENSOR 121 SIDE) |
| LOW SENSITIVITY | 0.15 | 0.20 | 0.30 | 0.35 | 0.35 | 0; CONTACT HAS NOT OCCURRED |

HEADPHONE DEVICE

BACKGROUND OF THE INVENTION

1. Field of the Invention

The present invention relates to a headphone device, particularly relates to a headphone device capable of performing communication by a telephone device as well as a method thereof and a program allowing a computer to execute the method.

2. Description of the Related Art

In related art, a headphone device which outputs voice from a cellular phone to a listener in a state that the listener wears the headphone device is widely used. For example, a sound source input/output device which receives an audio signal transmitted from a cellular phone and outputs the received audio signal to the headphone device by using a Bluetooth technique is proposed (for example, refer to Japanese Utility Model Registration No. 3116881 (Patent Document 1)).

SUMMARY OF THE INVENTION

In the above related-art technique, since voice from the cellular phone can be received through the sound source input/output device in the state of wearing the headphone device, it is possible to perform communication by the cellular phone without removing the headphone device. However, in this case, communication means for performing communication between the sound source input/output device and the cellular phone are necessary for both devices. Accordingly, when any of these devices is not provided with such communication means, the sound source input/output device is not capable of receiving the audio signal from the cellular phone, therefore, the device is not capable of outputting the audio signal to the headphone device. In this case, the listener removes the headphone device to perform communication by the cellular phone.

In view of the above, it is desirable that a listener listens to voice from a telephone device in a state of wearing a headphone device.

According to an embodiment of the invention, there is provided a headphone device including two output units for outputting playback audio which has been played back, a contact determination unit determining the occurrence of contact with respect to a telephone device, a first audio-collecting unit for collecting call voice generated from the telephone device, a second audio-collecting unit for collecting ambient external sound and an output audio control unit performing control so that the call voice is outputted from one output unit of the two output units and the external sound is outputted from the other output unit when it is determined that contact has occurred by the contact determination unit, a processing method thereof and a program allowing a computer to execute the method. According to this, when it is determined that contact has occurred between the headphone device and the telephone device by the contact determination unit, the call voice collected by the first audio-collecting unit can be outputted from one output unit of the two output units and the external sound collected by the second audio-collecting unit can be outputted from the other output unit.

According to the embodiment of the invention, it is also preferable that the contact determination unit determines the occurrence of contact with respect to the telephone device based on a level of an audio signal generated by the first audio-collecting unit. According to this, the occurrence of contact with respect to the telephone device can be determined by the contact determination unit based on the level of the audio signal generated by the first audio-collecting unit and the level of the audio signal generated by the second audio-collecting unit. In this case, it is also preferable that the contact determination unit determines the occurrence of contact with respect to the telephone device based on a spectrum level of the audio signal generated by the first audio-collection unit in the high frequency band. According to this, the occurrence of contact with respect to the telephone device can be determined by the contact determination unit based on the level of a high-frequency band component in a frequency domain of the audio signal generated by the first audio-collecting unit. In this case, it is also preferable that the contact determination unit determines the occurrence of contact with respect to the telephone device based on the spectrum level in the high frequency band higher than a frequency which is approximately $\frac{1}{3}$ of the maximum frequency in the audio signal generated by the first audio-collecting unit. According to this, the occurrence of contact with respect to the telephone device can be determined by the contact determination unit based on the spectrum level in the frequency band higher than the frequency which is approximately $\frac{1}{3}$ of the maximum frequency determined by frequency performance of the first audio-collecting unit.

In the case that the occurrence of contact with respect to the telephone device is determined based on the spectrum level of the audio signal generated by the first audio-collecting unit in the high frequency band, it is also preferable that the contact determination unit determines the occurrence of contact with respect to the telephone device based on the spectrum level in the high frequency band which is higher than a voice band. According to this, the occurrence of contact with respect to the telephone device can be determined based on the spectrum level in the frequency band higher than the voice band.

In the case that the occurrence of contact with respect to the telephone device is determined based on the level of the audio signal generated by the first audio-collecting unit, it is also preferable that the contact determination unit determines the occurrence of contact with respect to the telephone device based on a sound pressure level of the audio signal generated by the first audio-collecting unit. According to this, the occurrence of contact with respect to the telephone device can be determined based on the sound pressure level of the audio signal generated by the first audio-collecting unit and the sound pressure level of the audio signal generated by the second audio-collecting unit.

According to the embodiment of the invention, it is preferable that the headphone device further includes given pressure sensors detecting pressure generated by contact with respect to the telephone device, in which the contact determination unit specifies the first audio-collecting unit in the first and second audio-collecting units based on the magnitude of pressure respectively detected by the given pressure sensors when it is determined that contact has occurred, and the output audio control unit performs control so that the call voice collected by the first audio-collecting unit specified by the contact determination unit is outputted from one output unit and the external sound is outputted from the other output unit. According to this, the first audio-collecting unit which collects call voice is specified by the magnitude of pressure from given pressure sensors, and the call voice can be outputted from the output unit on the side of the specified first audio-collecting unit.

According to the embodiment of the invention, it is also preferable that the headphone device further includes a call voice adjustment unit adjusting an output level of a call voice signal based on the level difference between the call voice signal generated by the first audio-collecting unit and an external sound signal generated by the second audio-collecting unit, and supplying the adjusted call voice signal to one output unit. According to this, the output level of the call voice signal is adjusted based on the level difference between the call voice signal and the external sound signal and the adjusted call voice signal is supplied to one output unit. In this case, it is also preferable that the call voice adjustment unit adjusts the output level of the call voice signal based on the level difference between a spectrum level in the maximum frequency at which a spectrum of the call voice signal becomes maximum and a spectrum level of a frequency component of the external signal in the maximum frequency. According to this, the output level of the call voice signal can be adjusted by the call voice adjustment unit based on the level difference between the spectrum level in the maximum frequency at which a frequency component of the call voice signal becomes maximum and the spectrum level of a frequency component of the external signal corresponding to the maximum frequency.

In the case that the headphone device further includes the call voice adjustment unit adjusting the output level of the call voice signal based on the level difference between the call voice signal generated by the first audio-collecting unit and an external sound signal generated by the second audio-collecting unit and supplying the adjusted call voice signal to one output unit, it is also preferable that the call voice adjustment unit supplies a new external sound signal to the other output unit, which is generated based on the external sound signal and given attenuation characteristics. According to this, the new external sound signal generated based on the external sound signal and given attenuation characteristics by the call voice adjustment unit can be supplied to the other output unit.

According to the embodiment of the invention, it is also preferable that the output audio control unit performs control so that synthesized audio obtained by synthesizing the playback audio with the call voice set to given levels is outputted from one output unit. According to this, the synthesized audio obtained by synthesizing the playback audio with the call voice set to given levels can be outputted from one output unit.

According to the embodiment of the invention, it is also preferable that the output audio control unit performs control so that synthesized audio obtained by synthesizing the call voice with the external sound is outputted from one output unit. According to this, the synthesized audio obtained by synthesizing the call voice with the external sound can be outputted from one output unit.

According to the embodiment of the invention, it is also preferable that the second audio-collecting unit includes plural audio-collecting devices collecting ambient external sound. According to this, the external sound around the headphone device can be collected by the plural audio-collecting units.

According to the embodiment of the invention, it is possible to obtain an excellent advantage that the listener can receive voice from the telephone device in a state of wearing the headphone device.

BRIEF DESCRIPTION OF THE DRAWINGS

FIG. 5 is a chart showing the relation between determination speed by the contact determination unit and the weighting factors set to the smoothing processing unit according to an embodiment of the invention;

DESCRIPTION OF THE PREFERRED EMBODIMENTS

Hereinafter, best modes for carrying out the invention (hereinafter, referred to as embodiments) will be explained. The explanation will be made in the following order.
1. First Embodiment (Output audio control: Example of determining call voice by pressure sensors)
2. Second Embodiment (Output audio control: Example of determining call voice by the level of microphone audio)
3. Third Embodiment (Output audio control: Example of including a noise cancelling function)

1. First Embodiment

Figure 1A:
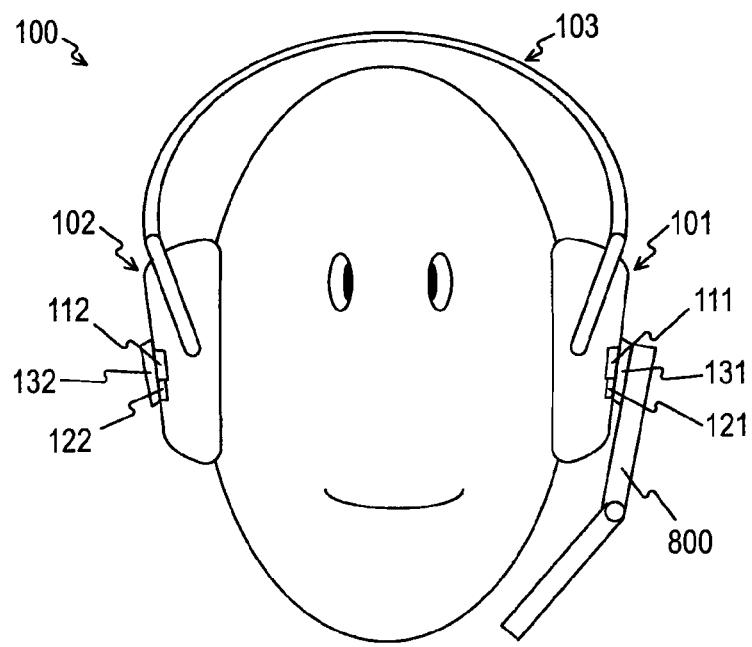
FIG. 1A to FIG. 1C are outline views showing an example of a headphone device according to an embodiment of the invention.
Figure 1B:
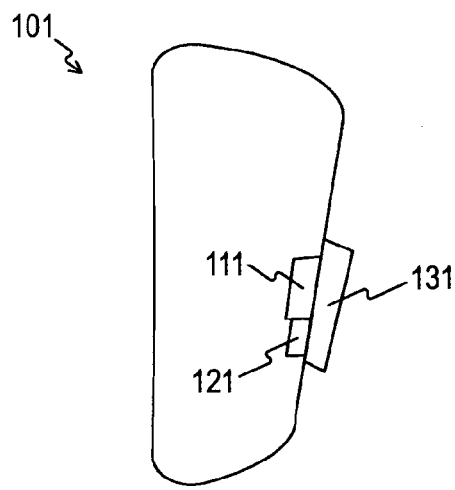
Figure 1C:
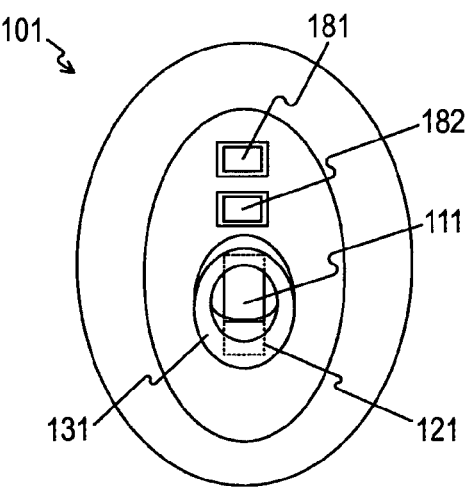

[Outline Example of a Headphone Device]
FIGS. 1A to 1C are outline views showing an example of a headphone device according to an embodiment of the invention. Here, assumption is made that a listener who is listening to an audio content by using the headphone device 100 receives an incoming call of a cellular phone 800.

FIG. 1A is an outline view showing the headphone device 100 which collects call voice generated from the cellular phone 800 and outputs the collected call voice to an ear of the listener. FIG. 1B is an enlarged view showing a side face of a casing 101 of the headphone device 100 shown in FIG. 1A. FIG. 1C is a front view showing the casing 101 shown in FIG. 1B.

FIG. 1A shows the headphone device 100 of an overhead band type. The headphone device 100 includes the casing 101, a casing 102 and a band 103. The casings 101, 102 are provided with microphones 111, 112, pressure sensors 121, 122 and impulsive noise absorbing materials 131, 132 respectively. The band 103 connects the casing 101 and the casing 102, and a signal line is arranged inside the band 103.

The microphones 111, 112 are provided for collecting call voice which is audio generated from the cellular phone 800 or external sound which is ambient noise of the headphone device 100. The microphones 111, 112 generate an audio signal by converting the collected audio into an electrical signal. Accordingly, the call voice from the cellular phone 800 is collected by providing the microphone 111, 112.

The pressure sensors 121, 122 are sensors detecting pressure generated by the cellular phone 800 being pressed on the impulsive noise absorbing materials 131, 132. That is, the pressure sensors 121, 122 detect pressure generated by contact between the headphone device 100 and the cellular phone 800. Accordingly, the pressure sensors 121, 122 are provided to thereby determine whether contact has occurred between the headphone device 100 and the cellular phone 800.

The impulsive noise absorbing materials 131, 132 are provided for alleviating impulsive noise caused by pressing the cellular phone 800 which outputs the call voice onto the microphone 111 or 112. The impulsive noise absorbing materials 131, 132 are made of, for example, rubber.

The cellular phone 800 is a telephone device performing communication with respect to other cellular phones, portable terminals and so on. The cellular phone 800 receives an audio signal transmitted from the other party's cellular phone and outputs the received audio signal as call voice. The cellular phone 800 also collects audio emitted from the listener wearing the headphone device 100 and performs given signal processing on the collected audio signal to be transmitted to the other party's cellular phone. The cellular phone is an example of the telephone device according to the embodiment of the invention.

FIG. 1B shows the microphone 111, the pressure sensor 121 and the impulsive noise absorbing material 131 provided at the casing 101. Inside the casing 101, the microphone 111 and the pressure sensor 121 are provided in the order from the top. The impulsive noise absorbing material 131 is provided outside the casing 101 so as to be overlapped with the pressure sensor 121.

FIG. 1C shows the microphone 111, the pressure sensor 121, impulsive noise absorbing material 131, an external-audio synthesizing button 181 and an audio-content synthesizing button 182 provided at the casing 101.

The external-audio synthesizing button 181 is a push-type setting button for setting an external sound synthesizing function to be valid. The external sound synthesizing function mentioned here is a function of outputting call voice including external sound to the listener by synthesizing the call voice collected by one microphone 111 or 112 with the external sound collected by the other microphone 112 or 111.

The audio-content synthesizing button 182 is a push-type setting button for setting an audio content synthesizing function to be valid. The audio content synthesizing function mentioned here is a function of outputting call voice including the audio content to the listener by synthesizing the call voice collected by the microphone 111 or 112 with the audio content the audio of which has been reduced to a fixed level. That is, it is the function of using the audio content played back by the headphone device 100 as BGM (Back Ground Music) when the listener performs communication by the cellular phone 800.

Figure 10:
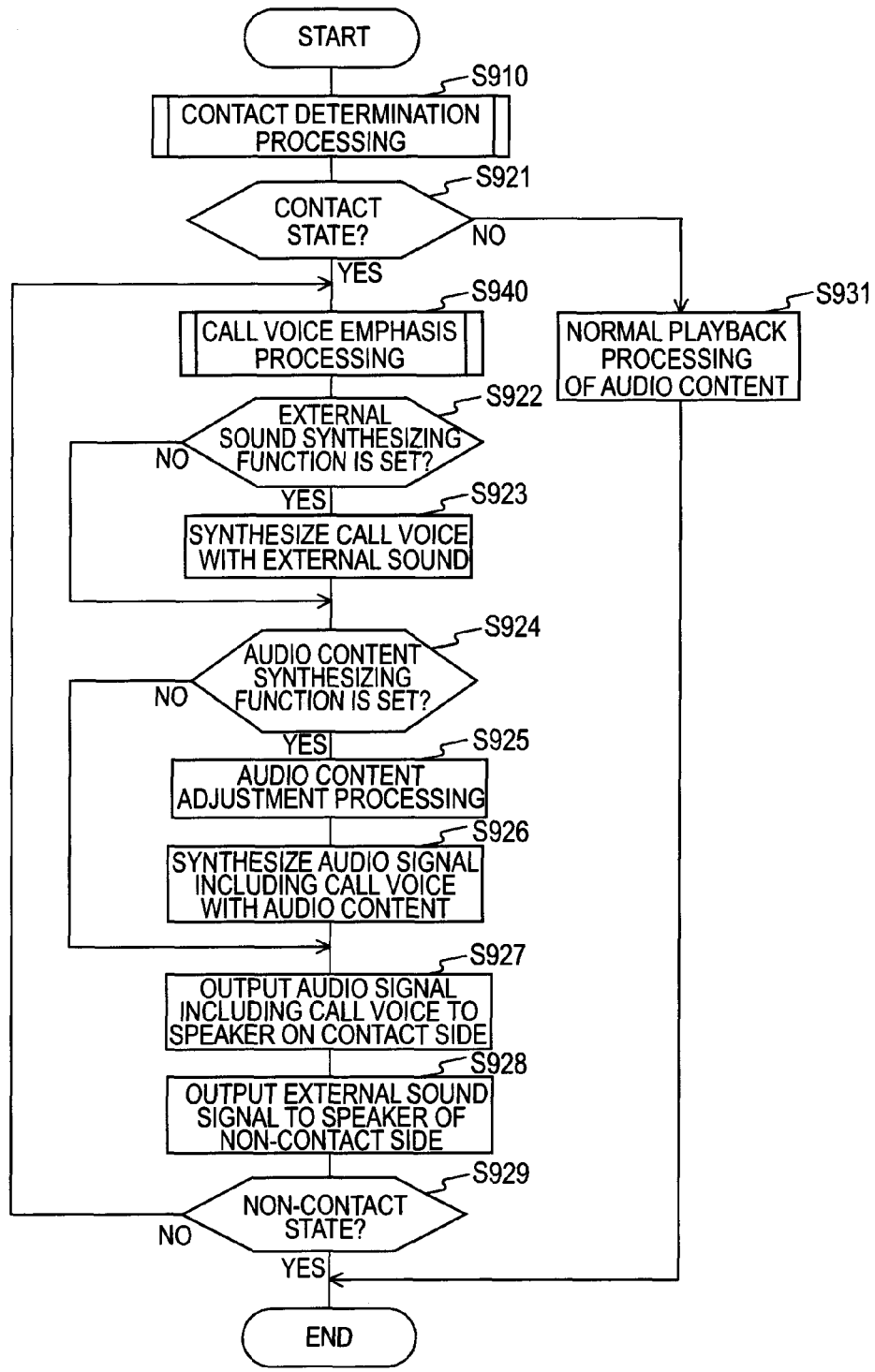
FIG. 10 is a flowchart showing an example of processing procedures of an output audio control method of the headphone device according to an embodiment of the invention.

Though the overhead-band type headphone device 100 has been explained as an example in the above case, a neck-band type headphone device can be also applied. FIG. 1B and FIG. 10 are conceptual views concerning the casing 101, and the casing 102 also has the same structure as the casing 101. Next, the entire functional configuration of the headphone device 100 including the internal audio signal processing configuration of the casing 101, 102 will be explained with reference to the drawing.

[Configuration Example of the Headphone Device]

Figure 2:
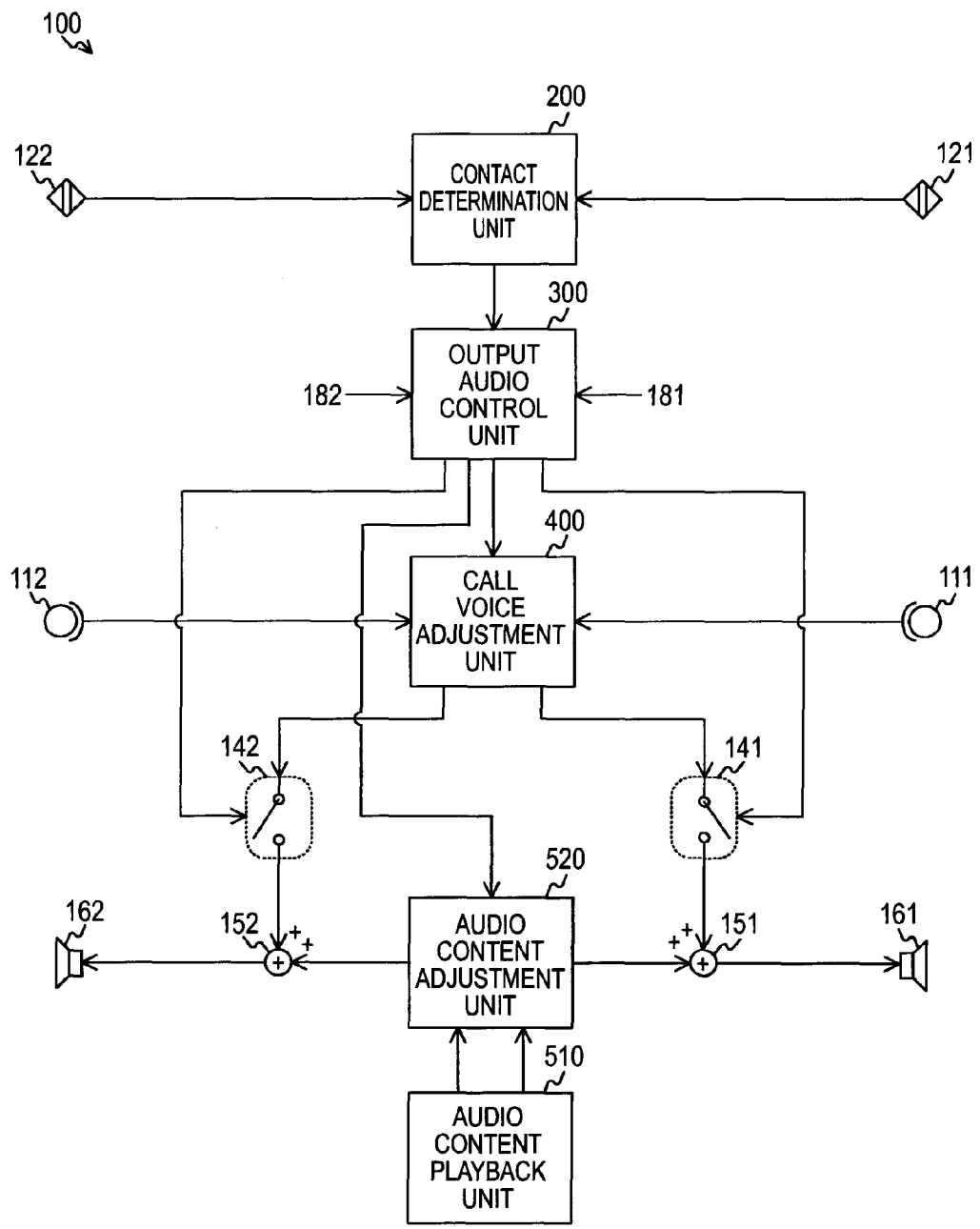
FIG. 2 is a block diagram showing a configuration example of a headphone device according to an embodiment of the invention.

FIG. 2 is a block diagram showing a configuration example of the headphone 100 according to the first embodiment of the invention. The headphone device 100 includes the microphones 111, 112, the pressure sensors 121, 122, changeover switches 141, 142, synthesizing units 151, 152, speakers 161, 162, a contact determination unit 200, and an output audio control unit 300. The headphone device 100 further includes a call voice adjustment unit 400, an audio content playback unit 510 and an audio content adjustment unit 520.

The microphones 111, 112 are microphones for collecting call voice generated from the cellular phone 800 or external sound which is ambient noise of the headphone device 100 as described with reference to FIGS. 1A to 1C. The microphones 111, 112 generate an audio signal by converting the collected audio into an electrical signal. For example, when a call voice signal is generated by the call voice from the cellular phone 800 being collected by the microphone 111, the microphone 112 generates an external sound signal by collecting ambient external sound of the casing 102. On the other hand, when the call voice signal is generated by the call voice from the cellular phone 800 being collected by the microphone 112, the microphone 111 generates the external sound signal by collecting the ambient external sound of the casing 101. The microphone 111, 112 supplies the generated audio signals to the call voice adjusting unit 400 respectively. The microphones 111, 112 are examples of first and second audio-collecting units according to the embodiment of the invention.

The pressure sensors 121, 122 are sensors for detecting pressure generated by contact between the impulsive noise absorbing material 131 or 132 and the cellular phone 800 as described with reference to FIG. 1A to FIG. 1C. The pressure sensors 121, 122 generate pressure signals by converting the magnitude of the generated pressure into electrical signals. The signal level of the pressure signal is assumed to be increased as the pressure is increased. The pressure sensors 121, 122 also output the generated pressure signals to the contact determination unit 200 respectively. For example, when the cellular phone 800 is pressed on the casing 101, the pressure sensor 121 outputs the pressure signal having the level larger than the pressure signal from the pressure sensor 122 to the contact determination unit 200. On the other hand, when the cellular phone 800 is pressed on the casing 102, the pressure sensor 122 outputs the pressure signal having the level larger than the pressure signal from the pressure sensor 121 to the contact determination unit 200. The pressure sensors 121, 122 are an example of given pressure sensors according to the embodiment of the invention.

The changeover switches 141, 142 are switches for switching connection/disconnection between the call voice adjustment unit 400 and the synthesizing units 151, 152 in accordance with control by the output audio control unit 300. The changeover switches 141, 142 perform switching between the call voice adjustment unit 400 and the synthesizing units 151, 152 to be a conductive (ON) state or a non-conductive (OFF) state based on the control by the output audio control unit 300. The changeover switches 141, 142 output audio signals supplied from the call voice adjustment unit 400 to the synthesizing units 151, 152 at the time of the ON-state.

Each of the synthesizing units 151, 152 generates a new audio signal by synthesizing the audio signal from the call voice adjustment unit 400 with the audio content signal adjusted by the audio content adjustment unit 520. The synthesizing units 151, 152 supply the newly generated audio signals to the speakers 161, 162, respectively. That is, the synthesizing unit 151 synthesizes the audio signal outputted from the changeover switch 141 with the audio content signal outputted from the audio content adjustment unit 520 and supplies the synthesized audio signal to the speaker 161. The synthesizing unit 152 synthesizes the audio signal outputted from the changeover switch 142 with the audio content signal outputted from the audio content adjustment unit 520 and supplies the synthesized audio signal to the speaker 162. When the changeover switches 141, 142 are in OFF-state, the synthesizing unit 151, 152 supplies only the audio content signals respectively supplied from the audio content adjustment units 520 to the speakers 161, 162.

The speakers 161, 162 output the audio signals generated by the synthesizing units 151, 152. The speakers 161, 162 output, for example, audio content signals from the audio content playback unit 510. When call voice is outputted from the speaker 161, the speaker 162 outputs, for example, the external sound signal from the microphone 112. Note that the speakers 161, 162 are installed inside the casings 101, 102. The speakers 161, 162 are an example of two output units according to the embodiment of the invention.

The contact determination unit 200 notifies that the cellular phone 800 has been pressed on the casing 100 or 102 to the output audio control unit 300. The contact determination unit 200 determines whether contact has occurred between the impulsive noise absorbing materials 131, 132 and the cellular phones 800 based on the pressure signals outputted from the pressure sensors 121, 122 respectively. The contact determination unit 200 determines the occurrence of contact by the cellular phone 800 when the level of the pressure signal of one of the pressure sensors 121, 122 exceeds a given contact threshold. When it is determined that contact has occurred, the contact determination unit 200 notifies a contact position indicating the position of the casing 101 or 102 where the pressure sensor 121 or 122 which has generated the pressure signal exceeding the contact threshold to the output audio contact unit 300. That is, the contact determination unit 200 supplies the determination result indicating the occurrence of contact and the contact position when it is determined that contact has occurred to the output audio control unit 300 as contact information.

For example, when the pressure signal from the pressure sensor 121 is higher than the contact threshold, the contact determination unit 200 notifies the determination result indicating that contact has occurred and the contact position indicating the position of the casing 101 where the pressure sensor 121 is installed to the output audio control unit 300. When the pressure signal from the pressure sensor 122 is higher than the contact threshold, the contact determination unit 200 notifies the determination result indicating that contact has occurred and the contact position indicating the position of the casing 102 where the pressure sensor 122 is installed to the output audio control unit 300. On the other hand, when both pressure signals from the pressure sensors 121, 122 are lower than the contact threshold, a determination result indicating contact has not occurred is supplied to the output audio control unit 300. The contact determination unit 200 is an example of a contact determination unit according to the embodiment of the invention.

The output audio control unit 300 performs control so as to output the audio signal generated by the microphones 111, 112 to the speakers 161, 162 based on the determination result supplied from the contact determination unit 200. For example, when it is determined that the contact has occurred by the contact determination unit 200, the output audio control unit 300 switches the changeover switches 141, 142 to the ON-state respectively. The output audio control unit 300 also controls the audio content adjustment unit 520 to stop audio content signals outputted from the audio content adjustment unit 520.

In this case, the output audio control unit 300 instructs the call voice adjustment unit 400 to output a call voice signal from the microphone 111 or 112 to the speaker 161 or 162 based on the contact position notified from the contact determination unit 200. For example, when the contact position notified from the contact determination unit 200 indicates the position of the casing 101, the output audio control unit 300 controls the call voice adjustment unit 400 to supply the call voice signal adjusted by the call voice adjustment unit 400 to the changeover switch 141. Accordingly, the call voice signal from the microphone 111 installed at the casing 101 which is contact with the cellular phone 800 to the speaker 161 provided at the casing 101.

On the other hand, the output audio control unit 300 outputs the external sound signal supplied from the microphone 111 or 112 installed at the other casing positioned opposite to the contact position notified by the contact determination unit 200 to the speaker 161 or 162 installed at the other casing. For example, when the contact position notified from the contact determination unit 200 indicates the casing 101, the output audio control unit 300 controls the call voice adjustment unit 400 to supply the external sound signal to which given processing has been performed in the call voice adjustment unit 400 to the changeover switch 142. Accordingly, the external sound signal from the microphone 112 installed in the casing 102 on the opposite side to the casing 101 which is contact with the cellular phone 800 can be outputted to the speaker 162 provided at the casing 102. In this manner, when it is determined that contact has occurred, external sound is outputted to the casing 102 or 101 which is opposite to the casing 101 or 102 in the contact state to thereby allow the listener himself/herself to listen to his/her speech who wears the headphone device 100. According to this, it is possible to restrain the listener from uttering unnecessarily loud voice with respect to the cellular phone 800.

When the external sound synthesizing function is valid, the output audio control unit 300 switches the changeover switch 141 and 142 to be the ON state respectively when it is determined that contact has occurred by the contact determination unit 200. The output audio control unit 300 also controls the audio content adjustment unit 520 to stop the audio content signals outputted from the audio content adjustment unit 520. At this time, when the casing 101 is notified as the contact position from the contact determination unit 200, the output audio control unit 300 allows the call voice signal adjusted in the call voice adjustment unit 400 to be synthesized with the external sound signal to which attenuation correction processing has been performed and supplies the synthesized call voice signal to the changeover switch 141. Accordingly, the call voice is allowed to be synthesized with the external sound and outputted to the speakers 161, 162, as a result, the listener can listen to voice of the listener himself/herself included in the external sound. Therefore, in addition to the external sound outputted from the speaker 161 or 162 on which the cellular phone 800 is not pressed, external sound is also synthesized with the call voice, thereby further restraining the listener from uttering unnecessarily loud voice.

Also, when the audio content synthesizing function is valid, the output audio control unit 300 switches the changeover switches 141, 142 to be the ON-state respectively when it is determined that contact has occurred by the contact determination unit 200. At this time, when the casing 101 is notified as the contact position by the contact determination unit 200, the output audio control unit 300 controls the audio content adjustment unit 520 to reduce the level of the audio content signal outputted to the speaker 161 to be a fixed level. Accordingly, the call voice signal from the microphone 111 which has been adjusted by the call voice adjustment unit 400 is synthesized with the audio content signal set to be the fixed level by the audio content adjustment unit 520 in the synthesizing unit 151, and the synthesized call voice signal is outputted to the speaker 161. In this case, the audio content adjustment unit 520 performs adjustment so as to reduce the volume of the audio content signal to an extent that does not annoy the listener.

When it is determined that the contact has not occurred by the contact determination unit 200, the output audio control unit 300 performs control so as to output the audio content signal played back by the audio content playback unit 510 to the speakers 161, 162. The output audio control unit 300 is an example of an output audio control unit according to the embodiment of the invention.

The example in which the output audio control unit 300 switches the both changeover switches 141, 142 to be the ON-state when it is determined that contact has occurred by the contact determination unit 200 has been explained as the above, however, it is not limited to the example. For example, the output audio control unit 300 may control the call voice adjustment unit 400 to output call voice from the both speakers 161, 162 when it is determined that contact has occurred by the contact determination unit 200.

Additionally, when it is determined that contact has occurred by the contact determination unit 200, the output audio control unit 300 may switch only the changeover switch 141 or 142 to be the ON state, which is on the side of the contact position notified by the contact determination unit 200. According to this, only call voice of the cellular phone 800 can be outputted from the speaker 161 or 162 on which the cellular phone 800 is pressed without outputting the external sound from the speaker 162 or 161 on which the cellular phone 800 is not pressed. In this case, it is also preferable that the audio content signal from the audio content playback unit 510 is supplied to the speaker 162 or 161 on which the cellular phone 800 is not pressed, and also preferable that the output of the audio signal is stopped to allow the speaker 162 or 161 to be in a mute state.

The call voice adjustment unit 400 performs processing for allowing call voice to be heard more easily by the listener with respect to the call voice signal generated by the microphone 111 or 112 in accordance with control by the output audio control unit 300. The call voice adjustment unit 400 adjusts, for example, the volume of the call voice signal generated by the microphone 111 or 112 so as to be larger than the external sound signal. The call voice adjustment unit 300 also performs, for example, equalizing processing on the call voice signal generated by the microphone 111 or 112.

The call voice adjustment unit 400 also performs attenuation correction processing on the external sound signal generated by the microphone 111 or 112 in accordance with control by the output audio control unit 300. The attenuation correction processing mentioned here is processing of convoluting a transfer function with respect to the external sound signal, which has attenuation characteristics generated by the external sound passing through the casing 101 or 102. The call voice adjustment unit 400 supplies the adjusted call voice signal to one changeover switches 141 or 142 under control by the output audio control unit 300 and supplies the external sound signal to which the attenuation correction processing has been performed to the other changeover switch 142 or 141.

When the external sound synthesizing function is valid, the call voice adjustment unit 400 synthesizes the adjusted call voice signal with the external sound signal to which the attenuation correction processing has been performed in accordance with the control by the output audio control unit 300. Then, the call voice adjustment unit 400 supplies the synthesized audio signal to the changeover switch 141 or 142 designated by the output audio control unit 300 as the call voice signal. For example, when the cellular phone 800 is pressed on the casing 101, the call voice adjustment unit 400 synthesizes the external sound signal from the microphone 112 with the call voice signal from the microphone 111 and outputs the synthesized call voice signal to the speaker 161 through the changeover switch 141. The call voice adjustment unit 400 is an example of a call voice adjustment unit according to the embodiment of the invention.

The audio content playback unit 510 generates audio content signals of a right channel and a left channel by playing back audio content data. The audio content playback unit 510 generates audio content signals, for example, by acquiring audio content data from a storage medium which stores audio content data and decoding the acquired audio content data. The audio content playback unit 510 also generates audio content signals by receiving audio content signals transmitted from an external device using a given communication system and decoding the received audio content signals. The audio content playback unit 510 further supplies the generated audio content signals to the audio content adjustment unit 520. The audio content signals generated by the audio content playback unit 510 are an example of playback audio according to the embodiment of the invention.

The audio content adjustment unit 520 adjusts the volume of the audio content signals supplied from the audio content playback unit 510 in accordance with control by the output audio control unit 300. When it is determined that contact has occurred by the contact determination unit 200, the audio content adjustment unit 520 stops output of audio content signals of both channels which are the right channel and the left channel, for example, in accordance with control by the output audio control unit 300. In this case, when the audio-content synthesizing button 182 is pressed, the audio content adjustment unit 520 sets the audio content signals to the volume which does not hinder the listener from listening to call voice.

As described above, the pressure sensors 121, 122 and the contact determination unit 200 are provided, thereby determining the occurrence of contact with respect to the cellular phone 800 and the contact position based on pressure signals generated by the pressure sensors 121, 122. Accordingly, it is possible to determine whether the audio collected by the microphones 111, 112 is call voice generated by the cellular phone 800 or external sound around the head phone device 100.

Additionally, the output audio control unit 300 is provided, thereby outputting call voice from one speaker 161 or 162 which is contact with the cellular phone 800 as well as outputting external sound from the other speaker 162 or 161. That is, when it is determined that contact has occurred by the contact determination unit 200, it is possible to allow one speaker of the two speakers 161, 162 to output call voice and allow the other speaker to output external sound. According to this, the listener can listen to speech of himself/herself with respect to the cellular phone 800, therefore, it is possible to prevent voice uttered by the listener from being unnecessarily loud.

[Configuration Example of the Contact Determination Unit and the Output Audio Control Unit]

Figure 3:
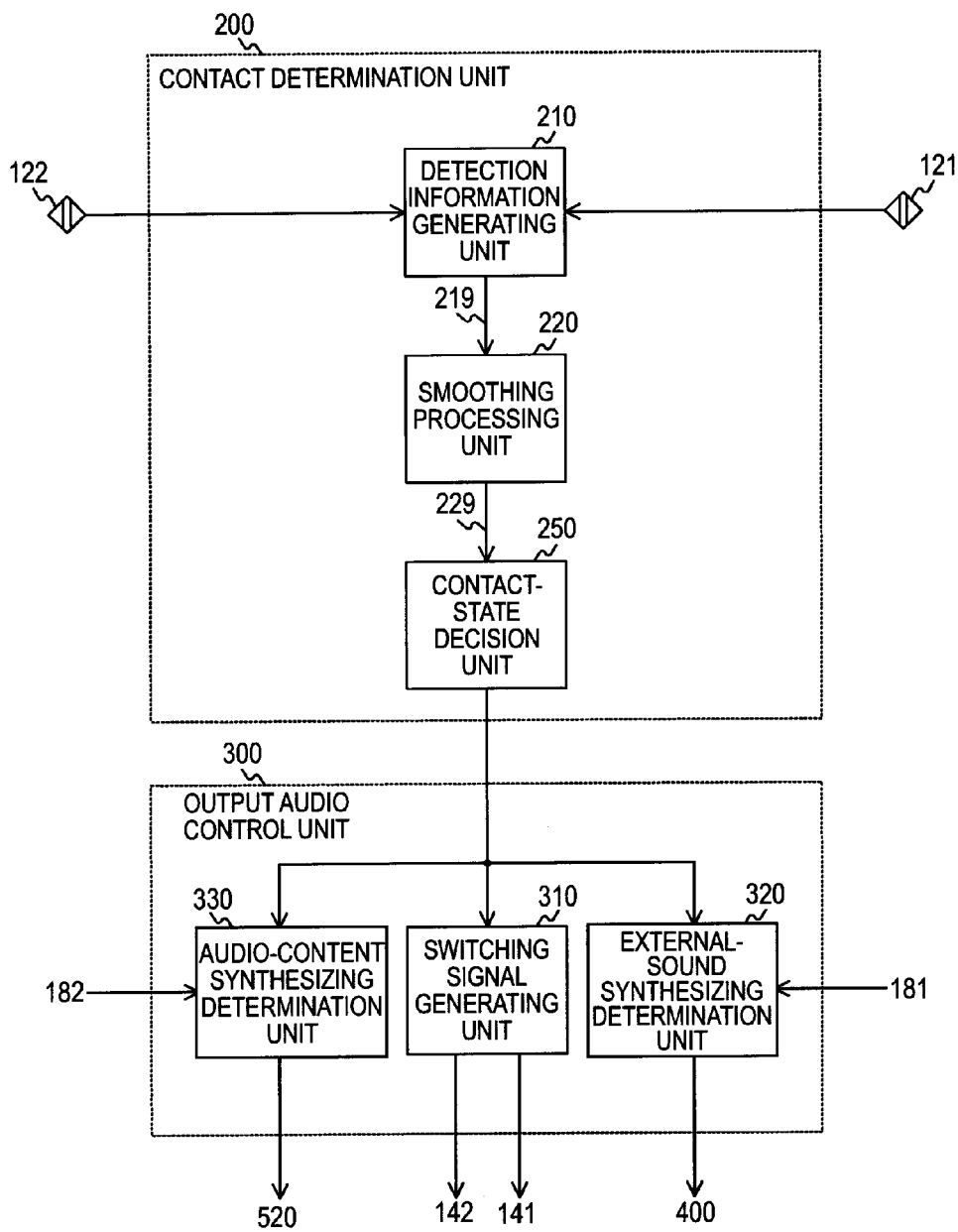
FIG. 3 is a block diagram showing a configuration example of a contact determination unit and an output audio control unit according to an embodiment of the invention.

FIG. 3 is a block diagram showing configuration examples of the contact determination unit 200 and the output audio control unit 300 according to the first embodiment of the invention. Here, the pressure sensors 121, 122, the contact determination unit 200 and the output audio control unit 300 are shown. Since the pressure sensors 121, 122 are the same as ones shown in FIG. 2, the same numerals are given and explanation will be omitted here.

The contact determination unit 200 includes a detection information generating unit 210, a smoothing processing unit 220 and a contact-state decision unit 250. The detection information generating unit 210 detects the occurrence of contact between the impulsive noise absorbing material 131 or 132 and the cellular phone 800 based on both pressure signals outputted from the pressure sensors 121, 122. When the level of one of the pressure signals from the pressure sensors 121, 122 exceeds the contact threshold, the detection information generating unit 210 determines that contact by the cellular phone 800 has occurred. Then, when it is determined that contact has occurred, the detection information generating unit 210 determines the contact position indicating the position of the casing 101 or 102 based on the pressure sensor 121 or 122 which has generated the pressure signal exceeding the contact threshold.

The detection information generating unit 210 also generates detection information indicating the occurrence of contact with respect to the cellular phone 800 and the contact position when determined that contact has occurred based on pressure signals outputted from the pressure sensors 121, 122 respectively. The detection information generating unit 210 outputs "0" as detection information when, for example, determined that contact by the cellular phone 800 has not occurred. On the other hand, when determined that contact has occurred, the detection information generating unit 210 outputs "1" in the case that the pressure signal from the pressure sensor 121 exceeds the contact threshold, and the detection information generating unit 210 outputs "−1" in the case that the pressure signal from the pressure sensor 122 exceeds the contact threshold.

The detection information generating unit 210 generates detection information, for example, at fixed intervals. The detection information generating unit 210 may start generating detection information from the time point when the pressure signal from one of the pressure sensors 121, 122 exceeds the contact threshold. Then, the detection information generating unit 210 completes generation of detection information after a fixed period of time from the time point when both pressure signals from the pressure sensors 121, 122 become equal to or lower than the threshold. The detection information generating unit 210 also outputs the generated detection information to the smoothing processing unit 220 through a signal line 219.

The smoothing processing unit 220 smoothes detection information based on plural detection information supplied from the detection information generating unit 210 through the signal line 219. The smoothing processing unit 220 smoothes values of detection information based on plural detection information supplied from the detected information generating unit 210 and a weighting factor which determines the smoothing degree of output values of the smoothing processing unit 220. The smoothing processing unit 220 supplies the smoothed detection information to the contact-state decision unit 250 through a signal line 229 as a detection result index. Accordingly, the detection result index is generated based on the present and past detection information by providing the smoothing processing unit 220, therefore, it is possible to reduce error detection such that the occurrence of contact is determined because objects other than the cellular phone 800 touch the casing 101 or 102 for a moment.

The contact-state decision unit 250 decides the occurrence of contact with respect to the cellular phone 800 and the contact position in the case that contact has occurred based on the detection result index supplied from the smoothing processing unit 220 through the signal line 229. The contact-state decision unit 250 supplies the decision result to a switching signal generating unit 310, the call voice adjustment unit 400 and the audio content adjustment unit 520 through the output audio control unit 300 as the determination result of the contact determination unit 200.

The output audio control unit 300 includes the switching signal generating unit 310, an external-audio synthesizing determination unit 320 and an audio-content synthesizing determination unit 330. The switching signal generating unit 310 generates switching signals for switching the changeover switches 141, 142 to be the ON-state or the OFF-state based on the decision result by the contact-state decision unit 250. The switching signal generating unit 310 generates a switching signal for switching the both changeover switches 141, 142 to be the ON-state when it is decided that contact has occurred by the contact-state decision unit 250. On the other hand, the switching signal generating unit 310 generates a switching signal for switching the both changeover switches 141, 142 to be the OFF-state when it is decided that contact has not occurred by the contact-state decision unit 250.

When external sound is controlled so as not to be outputted from the speaker 161 or 162 installed at the casing opposite to the contact position, the switching signal generating unit 310 generates a switching signal for switching one changeover switch 141 or 142 to be the ON-state based on the contact position. At the same time, the switching signal generating unit 310 generates a switching signal for switching the other changeover switch 142 or 141 to be the OFF-state.

The external-audio synthesizing determination unit 320 determines whether the external sound signal is synthesized with the call voice signal in the call voice adjustment unit 400 or not based on the decision result by the contact-state decision unit 250 and a pressed state of the external-audio synthesizing button 181. When it is decided that contact has occurred by the contact-state decision unit 250, the external-audio synthesizing determination unit 320 instructs the call voice adjustment unit 400 to output the call voice signal as it is to the changeover switch 141 or 142 in the case that the external-audio synthesizing button 181 is not pressed.

On the other hand, in the case that the external sound synthesizing function is set to be valid by the external-audio synthesizing button 181 when it is decided that contact has occurred, the external-audio synthesizing determination unit 320 instructs the call voice adjustment unit 400 to synthesize the external sound signal with the call voice signal. At the same time, the external-audio synthesizing determination unit 320 instructs the call voice adjustment unit 400 to output the synthesized audio signal to the changeover switch 141 or 142 on the side of the contact position decided by the contact-state decision unit 250. That is, when it is decided that contact has occurred by the contact-state decision unit 250, the external-audio synthesizing determination unit 320 notifies the contact position from the contact-state decision unit 250 and synthesizing information indicating whether the synthesis is necessary or not to the call voice adjustment unit 400.

The audio-content synthesizing determination unit 330 determines whether the call voice signal is synthesized with the audio content signal or not based on the decision result by the contact-state decision unit 250 and the pressed state of the audio-content synthesizing button 182. When it is decided that contact has occurred by the contact-state decision unit 250, the audio-content synthesizing determination unit 330 stops output from the audio content adjustment unit 520 in the case that the audio content synthesizing function is set to be invalid by the audio-content synthesizing button 182.

On the other hand, in the case that the external sound synthesizing function is set to be valid when it is decided that contact has occurred by the contact-state decision unit 250, the audio-content synthesizing determination unit 330 outputs the audio content signal from the audio content adjustment unit 520. Accordingly, the call voice signal from the call voice adjustment unit 400 is synthesized with the audio content signal from the audio content adjustment unit 520, and the synthesized audio signal is supplied to the speaker 161 or 162. The fixed level mentioned here is the level of a degree in which the audio content included in the call voice outputted from the speaker 161 or 162 does not annoy the listener. When it is decided that contact has occurred by the contact-state decision unit 250, the audio-content synthesizing determination unit 330, for example, notifies the contact position from the contact-state decision unit 250 and the output level of the audio content signal to the audio content adjustment unit 520.

[Configuration Example of the Smoothing Processing Unit]

Figure 4:
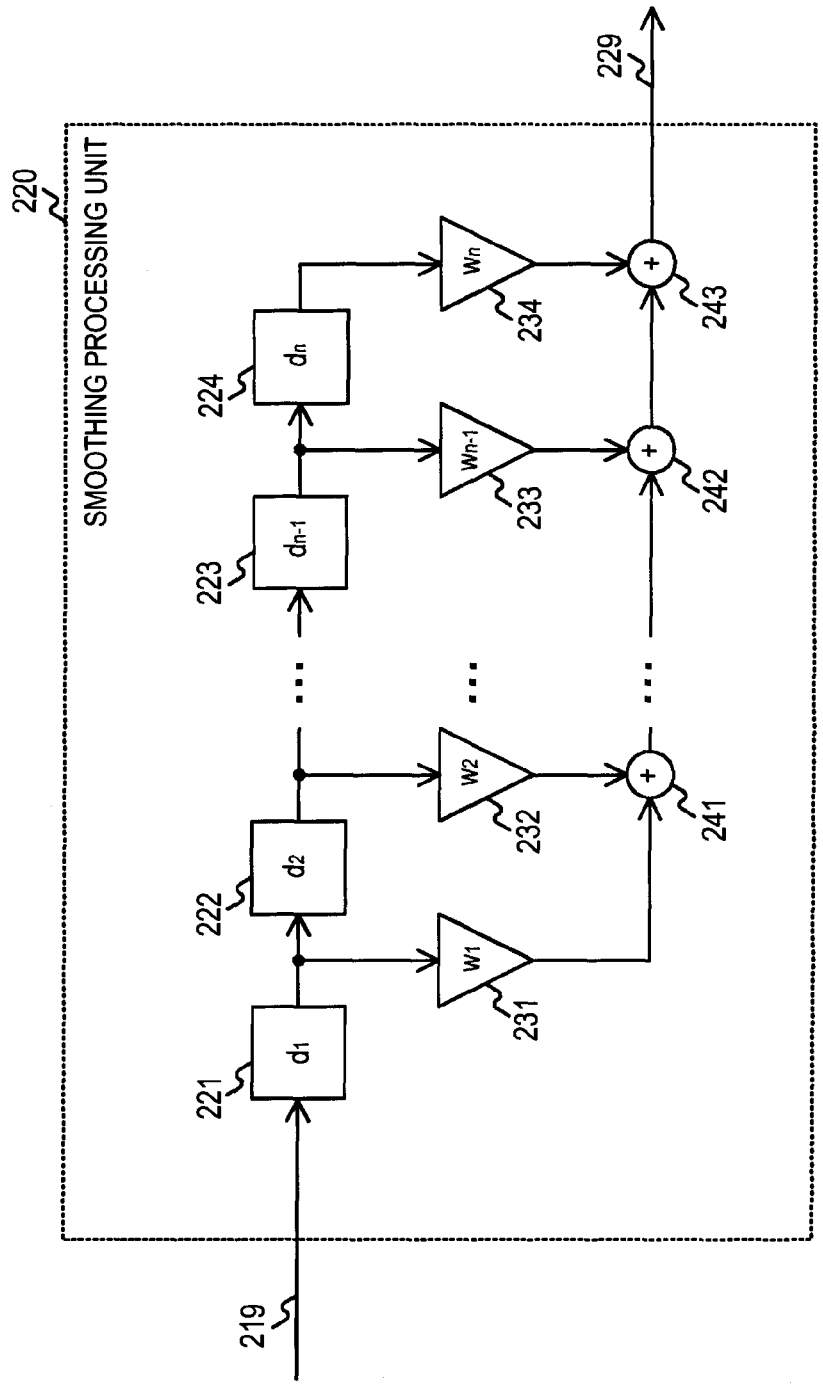
FIG. 4 is a block diagram showing a configuration example of a smoothing processing unit according to an embodiment of the invention.

FIG. 4 is a block diagram showing a configuration example of the smoothing processing unit 220 according to the first embodiment of the invention. The smoothing processing unit 220 includes delay devices 221 to 224, multipliers 231 to 234 and adders 241 to 243. In this example, assume that n-pieces of ("n" is an integer of 2 or more) detection information $d_1$ to $d_n$ at present and in the past is stored in the delay devices 221 to 224, and n-pieces of weighting factors $w_1$ to $w_n$ are set to the multipliers 231 to 234.

The delay device 221 to 224 configures a shift register which delays the detection information $d_1$ to $d_o$ from the signal line 219. That is, the detection information $d_1$ which is an output of the delay device 221 is inputted to the delay device 222 as well as supplied to the multiplier 231. The detection information $d_2$ which is an output of the delay device 222 is inputted to a not-shown next delay device as well as supplied to the multiplier 232. The detection information $d_{n-1}$ which is an output of the delay device 223 is inputted to the delay device 224 as well as supplied to the multiplier 233. The detection information $d_n$ which is an output of the delay device 224 is supplied to the multiplier 234.

The multipliers 231 to 234 are multipliers which multiply the detection information $d_1$ to $d_n$ supplied from the delay devices 221 to 224 by the weighting factors $w_1$ to $w_n$ set to the multipliers 231 to 234 respectively. That is, the multiplier 231 outputs a multiplied result of the detection information $d_1$ supplied from the delay device 221 and the weighting factor $w_1$ set to the multiplier 231 to the adder 241. The multiplier 232 also outputs a multiplied result of the detection information $d_2$ supplied from the delay device 222 and the weighting factor $w_2$ set to the multiplier 232 to the adder 241. The multiplier 233 outputs a multiplied result of the detection information $d_{n-1}$ supplied from the delay device 223 and the weighting factor $w_{n-1}$ set to the multiplier 233 to the adder 242. The multiplier 234 outputs a multiplied result of the detection information $d_n$ supplied from the delay device 224 and the weighting factor $w_n$ set to the multiplier 234 to the adder 243.

The adders 241 to 243 are adders which add outputs from the multipliers 231 to 342. Added results by the adder 243 are outputted through the signal line 229. The adder 241 outputs an added result of outputs from the multipliers 231, 232 to a not-shown next adder. The adder 242 outputs an added result of outputs from the multiplier 233 and a not-shown adder which is previous by one adder to the adder 234. The adder 234 outputs an added result of outputs from the adder 242 and the multiplier 234 to the contact-state decision unit 250 through the signal line 229 as a detection result index.

As described above, the delay devices 221 to 224, the multipliers 231 to 234 and the adders 241 to 243 are used together, thereby calculating the detection result index in which the detection information $d_1$ to $d_n$ are smoothed. Nest, the relation between the weighting factors $w_1$ to $w_n$ set to the multipliers 231 to 234 respectively and reaction speed at which the contact-state decision unit 250 decides that contact by the cellular phone 800 has occurred will be briefly explained with reference to the following drawing.

[Relation Between Weighting Factors and Determination Speed]

FIG. 5 is a chart showing the relation between determination speed by the contact determination unit 200 and the weighting factors $w_1$ to $w_n$ set to the smoothing processing unit 220 according to the first embodiment of the invention as an example. Here, a reaction sensitivity 270, a delayed device 280, a detection result index 291 and a contact-state decision result 292 are shown here.

The detection information $d_1$ to $d_n$ inputted to the four delayed devices 221 to 224 are shown in the delayed device 280. Here, assume that, in the case that the pressure signal from the pressure sensor 121 exceeds the contact threshold, "1" is outputted from the detection information generating unit 210, and in the case of the pressure signal from the pressure sensor 122 exceeds the contact threshold, "−1" is outputted from the detection information generating unit 210. In the case that pressure signals from the both pressure sensors 121, 122 are equal to or less than the threshold, "0" is outputted from the detection information generating unit 210. The example shows that "1" was inputted as the detection information $d_1$, $d_2$ to the delay devices 221, 222, and that "0" was inputted as the detection information $d_3$, $d_4$ to the delay devices 223, 224. That is, the state of the smoothing processing unit 220 just after the cellular phone 800 was pressed on the casing 101 on the side of the pressure sensor 121 is assumed.

The detection result indexes generated by the smoothing processing unit 220, that is, added results by the adder 243 are shown in the detection result index 291. The occurrence of contact by the cellular phone 800 and contact positions are shown in the contact-state decision result 292. In this example, when the contact-state decision result is equal to or more than 0.5, "1" indicating that contact has occurred at the casing 101 on side of the pressure sensor 121 is shown, and when the result is less than 0.5 as well as higher than −0.5, "0"

indicating that contact has not occurred is shown. When the contact-state decision result is equal to or less than −0.5, "−1" indicating that contact has occurred at the casing 102 on side of the pressure sensor 122 is shown.

As the reaction sensitivity 270, three examples of a high sensitivity 272, a standard sensitivity 273 and a low sensitivity 274 are shown here. In the high sensitivity 272, weighting factors ($w_1$ to $w_4$) 271 are set to 0.70, 0.20, 0.10 and 0.00 with respect to the multipliers 231 to 234 respectively. In this case, the detection result index 291 shows 0.90=(0.70×1.00)+(0.20×1.00)+(0.10×0.00)+(0.00×0.00). Therefore, the contact-state decision result 292 shows "1" indicating that contact has occurred on the side of the casing 101. Accordingly, the newer detection information $d_1$ and $d_2$ are multiplied by weighting factors $w_1$ and $w_2$ which are larger values, therefore, the detection result index 291 becomes a larger value relatively quickly when the cellular phone 800 is pressed.

In the standard sensitivity 273, weighting factors ($w_1$ to $w_4$) 271 are set to 0.25, 0.25, 0.25 and 0.25 with respect to the multipliers 231 to 234 respectively. In this case, the detection result index 291 shows 0.50=(0.25×1.00)+(0.25×1.00)+(0.25×0.00)+(0.25×0.00). Therefore, the contact-state decision result 292 shows "1" indicating that contact has occurred on the side of the casing 101. Accordingly, all weighting factors ($w_1$ to $w_4$) are the same value, therefore, the detection result index 291 shows a standard value.

In the low sensitivity 273, weighting factors ($w_1$ to $w_4$) 271 are set to 0.15, 0.20, 0.30 and 0.35 with respect to the multipliers 231 to 234 respectively. In this case, the detection result index 291 shows 0.35=(0.15×1.00)+(0.20×1.00)+(0.25×0.00)+(0.35×0.00). Therefore, the contact-state decision result 292 shows "0" indicating that contact has not occurred. Accordingly, the older detection information $d_4$ and $d_3$ are multiplied by weighting factors $w_4$ and $w_3$ which are larger values, therefore, the detection result index 291 is increased relatively slowly when the cellular phone 800 is pressed.

As described above, the weighting factors $w_1$ to $w_4$ to be set to the multipliers 231 to 234 are changed, thereby changing reaction speed from the time point when the cellular phone 800 is pressed until the contact-state decision unit 250 decides that contact has occurred. For example, the weighting factors are set to the low sensitivity 274, it is possible to prevent error detection such that the contact-state decision unit 250 decides that contact has occurred when a hand touches the casing 101 or 102 for a moment. The example in which the weighting factors $w_1$ to $w_4$ are previously set has been explained here, however, it is also preferable that the weighting factors are adjusted by providing an acceleration sensor at the headphone device 100 and by estimating movement of the headphone device 100 based on information from the acceleration sensor. Next, a configuration example of the call voice adjustment unit 400 will be explained with reference to a next drawing.

[Configuration Example of the Call Voice Adjustment Unit]

Figure 6:
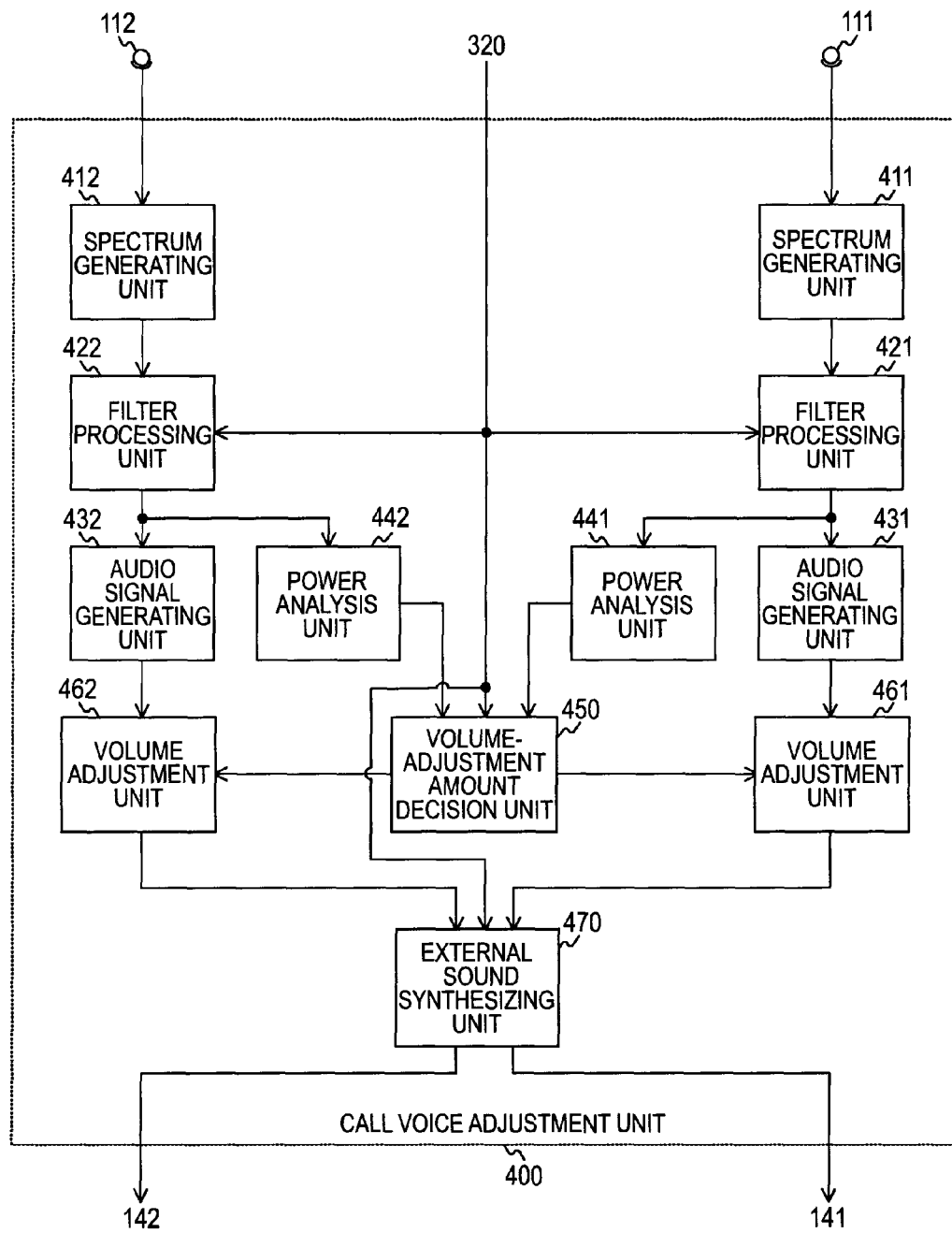
FIG. 6 is a block diagram showing a configuration example of a call voice adjustment unit according to an embodiment of the invention.

FIG. 6 is a block diagram showing a configuration example of the call voice adjustment unit 400 according to the first embodiment of the invention.

The call voice adjustment unit 400 includes spectrum generating units 411, 412, filter processing units 421, 422, audio signal generating units 431, 432, power analysis units 441, 442 and a volume-adjustment amount decision unit 450. The call voice adjustment unit 400 further includes volume adjustment units 461, 462 and an external sound synthesizing unit 470.

The spectrum generating units 411, 412 generate spectrum information by converting the audio signal supplied from the microphones 111, 112 from the time domain into the frequency domain. When the call voice signal is supplied from the microphone 111, the spectrum generating unit 411 generates spectrum information concerning the call voice signal by converting the call voice signal supplied from the microphone 111 from the time domain into the frequency domain. At this time, the spectrum generating unit 412 generates spectrum information concerning the external sound signal by converting the external sound signal supplied from the microphone 112 from the time domain into the frequency domain.

The spectrum generating units 411, 412 generate spectrum information by using, for example, Fast Fourier Transform (FFT) or octave division. The spectrum generating units 411, 412 also supply the generated spectrum information to the filter processing units 421, 422 respectively.

The filter processing units 421, 422 performs attenuation correction processing on spectrum information in the external sound signal from the microphones 111 or 112 in accordance with the contact position notified by the external sound synthesizing determination unit 320. The filter processing units 421, 422 convolutes a transfer function indicating attenuation characteristics by the casing 101 or 102 with respect to the spectrum information in the external sound signal as the attenuation correction processing. The filter processing units 421, 422 also perform bandpass filter processing which transmits low-range to middle-range frequency bands on the spectrum information from the spectrum generating units 411, 412, considering the frequency band of call voice generated from the cellular phone 800.

When the contact position indicating the casing 101 is notified by the external sound synthesizing determination unit 320, the filter processing unit 421 performs bandbass filter processing on the spectrum information concerning the call voice signal generated by the spectrum generating unit 411. On the other hand, the filter processing unit 422, after the bandpass filter processing is performed on spectrum information concerning the external sound signal generated by the spectrum generating unit 412, performs attenuation correction processing on the spectrum information to which the bandpass filter processing has been performed.

On the other hand, when the contact position indicating the casing 102 is notified by the external sound synthesizing determination unit 320, the filter processing unit 422 performs bandbass filter processing on the spectrum information concerning the call voice signal generated by the spectrum generating unit 412. On the other hand, the filter processing unit 421, after the bandpass filter processing is performed on the spectrum information concerning the external sound signal generated by the spectrum generating unit 411, performs attenuation correction processing on the spectrum information to which the bandpass filter processing has been performed.

The filter processing units 421, 422 supplies spectrum information of the call voice signal to which the bandpass filter processing has been performed or spectrum information of the external sound signal to which the attenuation correction processing has been performed to the audio signal generating unit 431 or 432 and the power analysis unit 441 or 442. The filter processing unit 421 or 422 is an example of a call voice adjustment unit according to the embodiment of the invention.

The power analysis units 441, 442 perform power analysis based on the spectrum information supplied from the filter processing units 421, 422. The power analysis units 441, 442 generate power envelopes based on the spectrum information from the filter processing units 421, 422. That is, the power analysis units 441, 442 calculate power values of respective frequency components based on the spectrum information from the filter processing units 421, 422. The power analysis units 441, 442 output the calculated power values of respective frequency components to the volume-adjustment amount decision unit 450 respectively.

For example, when the spectrum information of the call voice signal is supplied from the filter processing unit 421, the power analysis unit 441 calculates power values of respective frequency components of the call voice signal based on the spectrum information of the call voice signal and outputs the values to the volume-adjustment amount decision unit 450. At this time, the power analysis unit 442 calculates power values of respective frequency components of the external sound signal based on the spectrum information to which the attenuation correction processing has been performed by the filter processing unit 422 and outputs the calculated power values to the volume-adjustment amount decision unit 450.

The volume-adjustment amount decision unit 450 decides an adjustment amount of volume with respect to the call voice signal based on the contact position notified by the external sound synthesizing determination unit 320 and power envelopes generated by the power analysis units 441, 442. The volume-adjustment amount decision unit 450 decides the adjustment amount of volume with respect to the call voice signal based on the level difference between power envelopes generated by the power analysis units 441, 442 respectively. When the contact position indicating the casing 101 is notified by the external sound synthesizing determination unit 320, the volume-adjustment amount decision unit 450 compares the power envelope of the call voice signal from the power analysis unit 441 with the power envelope of the external sound signal from the power analysis unit 442. Then, the volume-adjustment amount decision unit 450 decides the adjustment amount of volume of the call voice signal with respect to the volume adjustment unit 461 based on the comparison result. However, the volume-adjustment amount decision unit 450 does not perform volume adjustment to the external sound signal generated by the audio signal generating unit 432 because the attenuation correction processing has been performed to the external sound signal.

The audio signal generating units 431, 432 converts spectrum information supplied from the filter processing units 421, 422 from the frequency domain to the time domain, thereby generating audio signals. The audio signal generating units 431, 432 supply the generated audio signals to the volume adjustment units 461, 462.

The volume adjustment units 461, 462 adjusts volume of audio signals supplied from the audio signal generating units 431, 432 based on the adjustment amount designated by the volume-adjustment amount decision unit 450. For example, when the call voice signal is supplied from the audio signal generating unit 431, the volume adjustment unit 461 increases the volume of the call voice signal in accordance with the adjustment amount generated by the volume-adjustment amount decision unit 450. On the other hand, the volume adjustment unit 462 outputs the external sound signal from the audio signal generating unit 432 as it is. The volume adjustment units 461, 462 adjust the volume of audio signals supplied from the audio signal generating units 431, 432 and respectively output the adjusted audio signals to the external sound synthesizing unit 470.

The external sound synthesizing unit 470 synthesizes the call voice signal supplied from one volume adjustment unit 461 or 462 with the external sound signal supplied from the other volume adjustment unit 462 or 461 based on synthesizing information from the external-audio synthesizing determination unit 320. When the external-audio synthesizing determination unit 320 instructs the external sound synthesizing unit 470 to synthesize signals, the external sound synthesizing unit 470 synthesize the call voice signal with the external sound signal from the volume adjustment units 461, 462 and supplies the synthesized audio signal to the changeover switch 141 or 142 on the side of the contact position. At the same time, the external sound synthesizing unit 470 outputs the external sound signal from the volume adjustment unit 462 or 461 as it is to the changeover switch 142 or 141 on the opposite side of the contact position.

On the other hand, when the external-audio synthesizing determination unit 320 does not instruct the external sound synthesizing unit 470 to synthesize signals, the external sound synthesizing unit 470 outputs the call voice signal supplied from the volume adjustment unit 461 or 462 on the side of the contact position as it is to the changeover switch 141 or 142 on the side of the contact position. At this time, the external sound synthesizing unit 470 outputs the external sound signal supplied from the volume adjustment unit 462 or 461 on the opposite side of the contact position as it is to the changeover switch 142 or 141 on the opposite side of the contact position.

As described above, it is possible to output the external sound signal generated by the microphone 111 or 112 to which attenuation correction processing has been performed from the speaker 161 or 162 by providing the filter processing units 421, 422. According to this, the degree to which the listener feels unnatural with respect to the external sound outputted from the speaker 161 or 162 on which the cellular phone 800 is not pressed can be reduced.

[Conceptual Diagram Concerning Attenuation Correction Processing]

Figure 7:
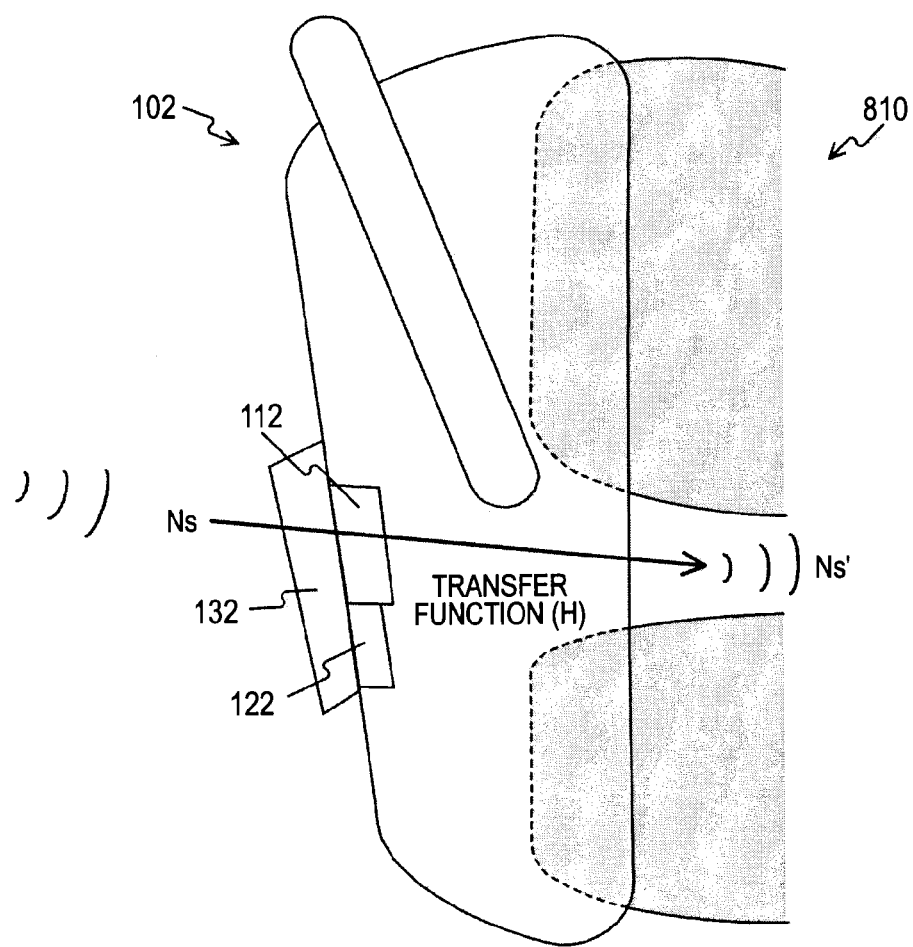
FIG. 7 is a conceptual diagram concerning attenuation correction processing by filter processing units according to an embodiment of the invention.

FIG. 7 is a conceptual diagram concerning attenuation correction processing by the filter processing units 421, 422 according to the first embodiment of the invention. The casing 102 and a human ear 810 are shown here. The casing 102 is provided with the microphone 112, the pressure sensor 122 and the impulsive noise absorbing material 132 shown in FIG. 1A. Here, "Ns" indicates a frequency characteristic of external sound around the casing 102 and "Ns'" indicates a frequency characteristic of attenuated audio when the external sound (Ns) attenuated by being passed through the casing 102 reaches the human ear 810.

In this case, the relation between the frequency characteristic of external sound (Ns) and the frequency characteristic of attenuated audio (Ns') is represented by a transfer function (H). Therefore, the frequency characteristic of attenuated audio (Ns') can be calculated by using the frequency characteristic of external sound (Ns) and the transfer function (H). That is, the frequency characteristic of attenuated audio (Ns') can be calculated by convoluting the transfer function (H) with respect to the frequency characteristic of external sound (Ns). The transfer function (H) is a transfer function which can be obtained by being measured previously in an ideal environment.

As described above, since the attenuated audio (Ns') can be estimated by convoluting the previously obtained transfer function (H) with respect to the external sound signal, the listener can listen to external sound outputted from the speaker 162 installed at the casing 102 without feeling unnatural.

[Example of a Calculation Method of an Adjustment Amount by the Volume-Adjustment Amount Decision Unit]

Figure 8A:
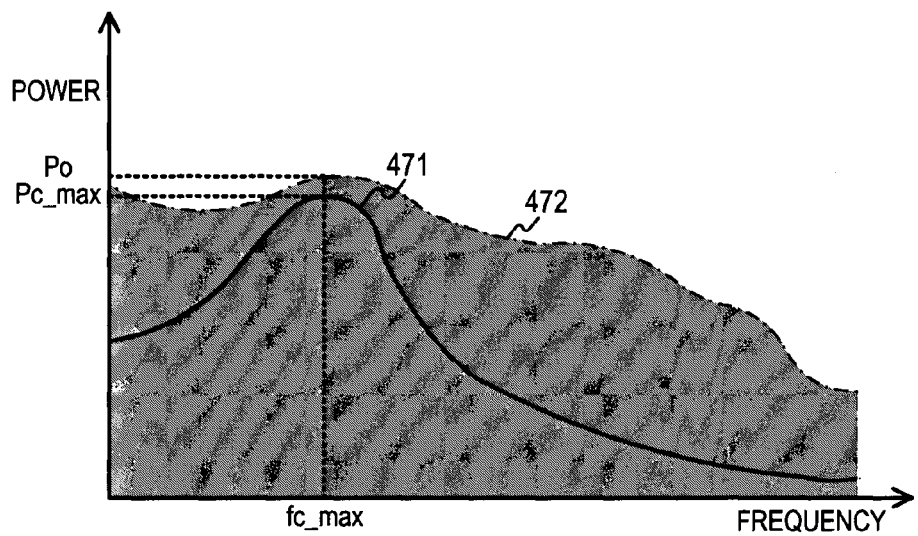
FIG. 8A and FIG. 8B are conceptual graphs showing an example concerning a calculation method of an adjustment amount by a volume-adjustment amount decision unit according to an embodiment of the invention.
Figure 8B:
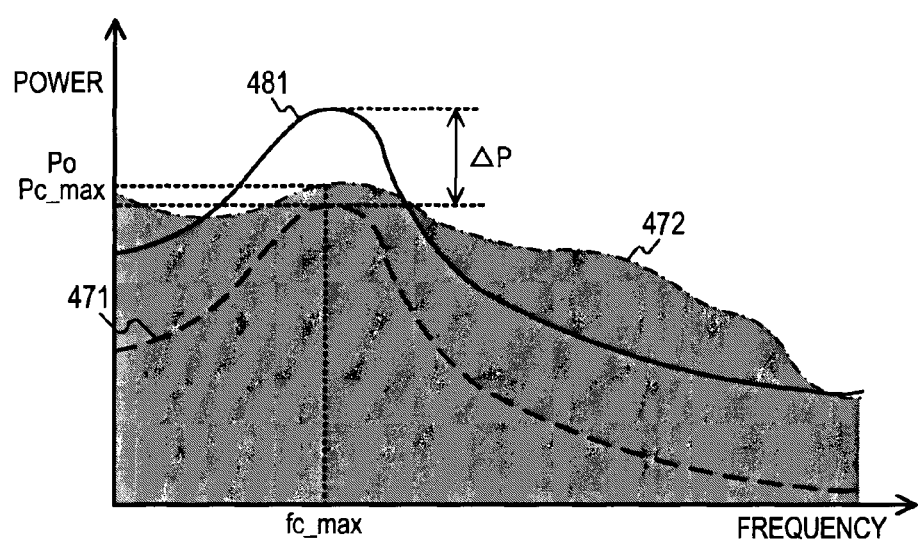

FIG. 8A and FIG. 8B are conceptual graphs showing an example concerning a calculation method of the adjustment amount by the volume-adjustment amount decision unit 450 according to the first embodiment of the invention. FIG. 8A is a graph showing power envelopes of a call voice signal and an external sound signal before the audio signal is adjusted by the volume-adjustment amount decision unit 450. FIG. 8B is a graph showing power envelopes of the call voice signal and the external sound signal when the call voice signal shown in FIG. 8A has been adjusted by the volume-adjustment amount decision unit 450. In this case, the horizontal axis represents the frequency and the vertical axis represents power.

In FIG. 8A, a call voice characteristic 471 is shown by a solid line and an external sound characteristic 472 is shown by a chain line. The call voice characteristic 471 is the power envelope indicating power values of respective frequency components in the call voice signal generated by the power analysis unit 441 or 442. In the call voice characteristic 471, the power value (Pc_max) becomes maximum at a frequency (fc_max). That is, the spectrum level in the maximum frequency (fc_max) at which the spectrum of the call voice signal becomes maximum is the maximum power value (Pc_max).

The external sound characteristic 472 is the power envelope indicating power values of respective frequency components in the external sound signal generated by the power analysis unit 441 or 442. A power value (Po) in the external characteristic corresponding to the frequency (fc_max) is higher than the maximum power value (Pc_max) of the call voice characteristic 471. The spectrum level of the frequency component of the external sound signal in the maximum frequency (fc_max) is the power value (Po).

When the call voice characteristic 471 is buried in the external sound characteristic 472 as the above, the external sound sounds larger than the call voice outputted from the speaker 161 or 162, therefore, it is difficult that the listener listens to call voice. Accordingly, the volume adjustment as shown in FIG. 8B is performed by the volume-adjustment amount decision unit 450.

In FIG. 8B, a call voice characteristic 481 is shown by a solid line, the external sound characteristic 472 is shown by a chain line and the call voice characteristic 471 is shown by a dashed line. In this case, since the call voice characteristic 471 and the external sound characteristic 472 are the same as ones shown in FIG. 8A, explanation is omitted here. The call voice characteristic 481 is a power envelope obtained by increasing the volume of the call voice signal supplied from the audio signal generating unit 431 or 432 by an adjustment amount (ΔP).

As described above, power values in the vicinity of the maximum frequency (fc_max) in the call voice characteristic 481 obtained by increasing the call voice signal of the call voice characteristic 471 by the adjustment amount (ΔP) are larger than power values in the external sound characteristic 472. Therefore, it is easy that the listener listens to call voice outputted from the speaker 161 or 162.

Here, a method of calculating the adjustment amount (ΔP) by the volume-adjustment amount decision unit 450 will be briefly explained. In the example, the volume-adjustment amount decision unit 450 acquires the maximum power value (Pc_max) in power values of respective frequency components in the call voice characteristic 471 and the frequency (fc_max) at the maximum power value. Then, the volume-adjustment amount decision unit 450 compares the maximum power value (Pc_max) of the call voice characteristic 471 with the power value (Po) of the external sound characteristic 472 corresponding to the frequency (fc_max) at the maximum power value (Pc_max) of the call voice characteristic 471. Since the power value of the external sound characteristic 472 is larger at this time, the adjustment amount (ΔP) for increasing the volume of the call voice signal is calculated based on the maximum power value (Pc_max) of the call voice characteristic 471 and the power value (Po) of the external sound characteristic 472.

As described above, the volume-adjustment amount decision unit 450 compares the spectrum level in the maximum frequency (fc_max) at which the spectrum of the call voice signal becomes maximum with the spectrum level of the frequency component of the external signal corresponding to the frequency (fc_max). Then, the volume-adjustment amount decision unit 450 adjusts the output level of the call voice signal based on the level difference between the both spectrum levels.

[Example in which an Auxiliary Microphone is Added to the Headphone Device]

Figure 9:
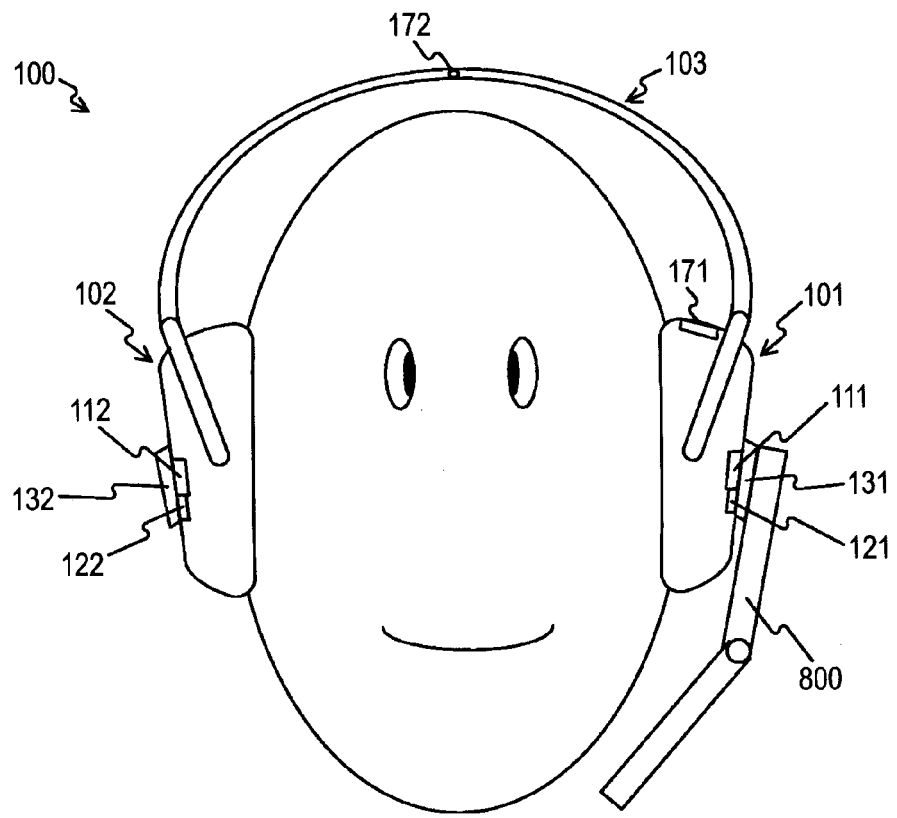
FIG. 9 is an outline view showing a modification example of the headphone device according to an embodiment of the invention.

FIG. 9 is an outline view showing a modification example of the headphone device 100 according to the first embodiment of the invention. The headphone device 100 includes an auxiliary microphone 171 at the casing 101 and an auxiliary microphone 172 at the band 103 in addition to components of the headphone device 100 shown in FIG. 1A. Since components other than the auxiliary microphones 171, 172 are the same as components of FIG. 1A, the same numerals are given to the components and explanation is omitted here.

The auxiliary microphones 171, 172 are microphones for collecting external sound which is noise around the headphone device 100. The auxiliary microphones 171, 172 are provided at regions not covered by the cellular phone 800. The auxiliary microphones 171, 172 generate an external sound signal by converting the collected external sound into an electrical signal. The auxiliary microphone 171 or 172 is an example of each of plural audio-collecting devices according to the embodiment of the invention.

As described above, the auxiliary microphones 171, 172 are provided at regions not covered by the cellular phone 800, thereby collecting external sound in the vicinity of the speaker 161 or 162 which outputs call voice when the external sound synthesizing function is set to be valid. According to this, it is possible to output more natural external sound from the speaker 161 or 162.

[Operation Example of the Headphone Device]

Next, operations of the headphone device 100 according to the first embodiment of the invention will be explained with reference to the drawings.

FIG. 10 is a flowchart showing an example of processing procedures of an output audio control method of the headphone device 100 according to the first embodiment of the invention. In the example, external sound is assumed to be outputted from the speaker 161 or 162 which is opposite to the contact position notified by the contact determination unit 200.

First, contact determination processing for determining the occurrence of contact is performed by the contact determination unit 200 (Step S910). The contact determination processing will be explained with reference to FIG. 11. Step S910 is an example of the step of determining the occurrence of contact according to the embodiment of the invention. Next, the occurrence of contact by the cellular phone 800 is determined by the contact determination unit 200 (Step S921). Then, it is determined that contact has not occurred by the contact determination unit 200, an audio content played back by the audio content playback unit 510 is outputted from the speaker 161 or 162 (Step S931), and output audio control processing ends.

On the other hand, when it is determined that contact has occurred by the contact determination unit 200, call voice emphasis processing is performed (Step S940). The call voice emphasis processing will be explained with reference to FIG. 12. Subsequently, whether the external sound synthesizing function is set to be valid or not is determined by the external-audio synthesizing button 181 (Step S922). Then, when the external sound synthesizing function is not valid, the process proceeds to Step S924. On the other hand, when the external sound synthesizing function is valid, a call voice signal including an external sound signal is generated by synthesizing the call voice signal with the external sound signal by the call voice adjustment unit 400 (Step S923).

Next, whether the audio content synthesizing function is set to be valid or not is determined by the audio-content synthesizing button 182 (Step S924). Then, when the audio content synthesizing function is not valid, the process proceeds to Step S927. On the other hand, when the audio content synthesizing function is valid, audio content adjustment processing in which the volume of the audio content signal from the audio content playback unit 510 is reduced to the fixed level by the audio content adjustment unit 520 is performed (Step S925). The fixed level mentioned here is the level in which telephone communication by the cellular phone 800 is not interrupted. Subsequently, the call voice signal including an audio content signal is generated by synthesizing the call voice signal from the call voice adjustment unit 400 with the audio content signal to which the audio content adjustment processing has been performed (Step S926).

Next, when the voice call signal is supplied to the speaker 161 or 162 on the side of the contact position notified by the contact determination unit 200, audio including call voice is outputted (Step S927). Then, when the external sound signal generated by the call voice adjustment unit 400 is supplied to the speaker 161 or 162 installed at the casing 102 which is opposite to the contact position notified by the contact determination unit 200, the external sound is outputted (Step S928). Step S927 and Step S928 are an example of the step of controlling output audio according to the embodiment of the invention.

After that, the occurrence of contact is determined by the contact determination unit 200 (Step S929). When it is determined that contact has occurred by the cellular phone 800, the process returns to Step S940, and the above processes are repeated until it is determined that contact has not occurred. On the other hand, when it is determined that contact has not occurred, the audio content played back by the audio content playback unit 510 is outputted from the speakers 161, 162 and the output audio control processing ends.

[Processing Example of the Contact Determination Unit]

Figure 11:
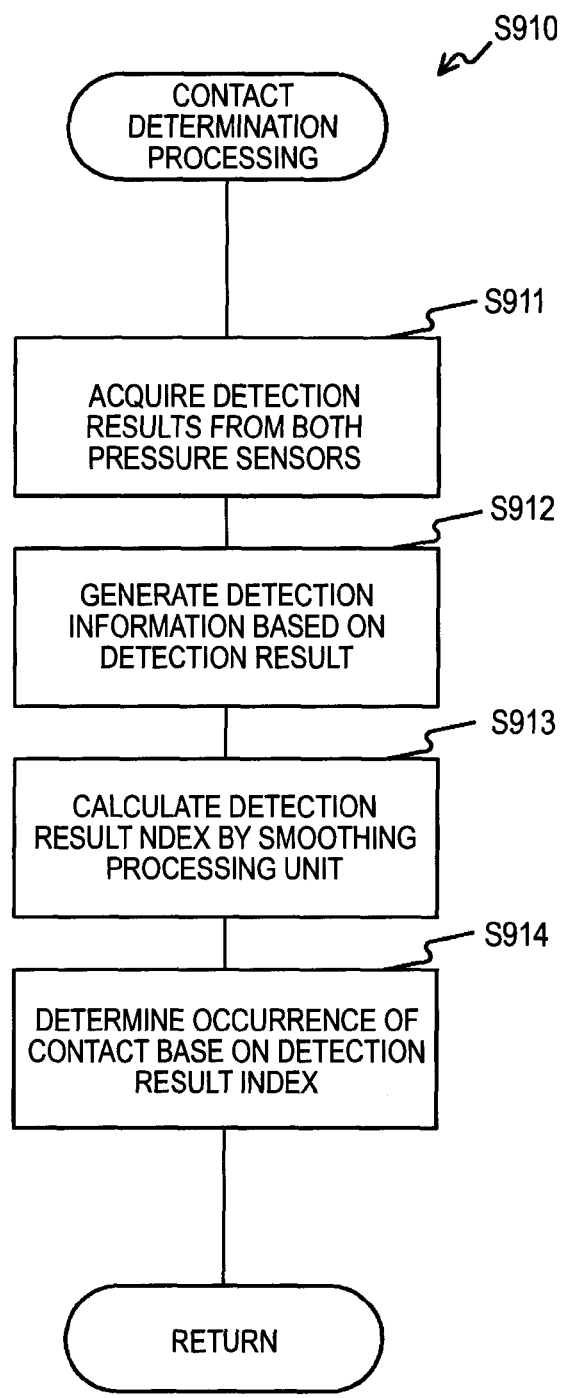
FIG. 11 is a flowchart showing an example of processing procedures of contact determination processing by the contact determination unit according to an embodiment of the invention.

FIG. 11 is a flowchart showing an example of processing procedures of contact determination processing (Step S910) by the contact determination unit 200 according to the first embodiment of the invention.

First, pressure signals respectively generated by the pressure sensors 121, 122 are detected by the detection information generating unit 210 (Step S911). The detection processing can be detected at fixed time intervals. It is also preferable that the detection processing is started when any of pressure signals exceeds the contact threshold and is ended after a fixed period of time has passed from the point when both pressure signals become equal to or less than the contact threshold.

Then, detection information indicating the occurrence of contact and the contact position is generated based on the pressure signal detected by the detection information generating unit 210 (Step S912). Subsequently, the sum of products of plural detection information generated by the detection information generating unit 210 and weighting factors is calculated to obtain a detection result index by the smoothing processing unit 220 (Step S913). Subsequently, the occurrence of contact is determined based on the detection result index by the contact-state decision unit 250 (Step S914) and the decision result is updated to complete the contact determination processing.

[Processing Example of the Call Voice Adjustment Unit]

Figure 12:
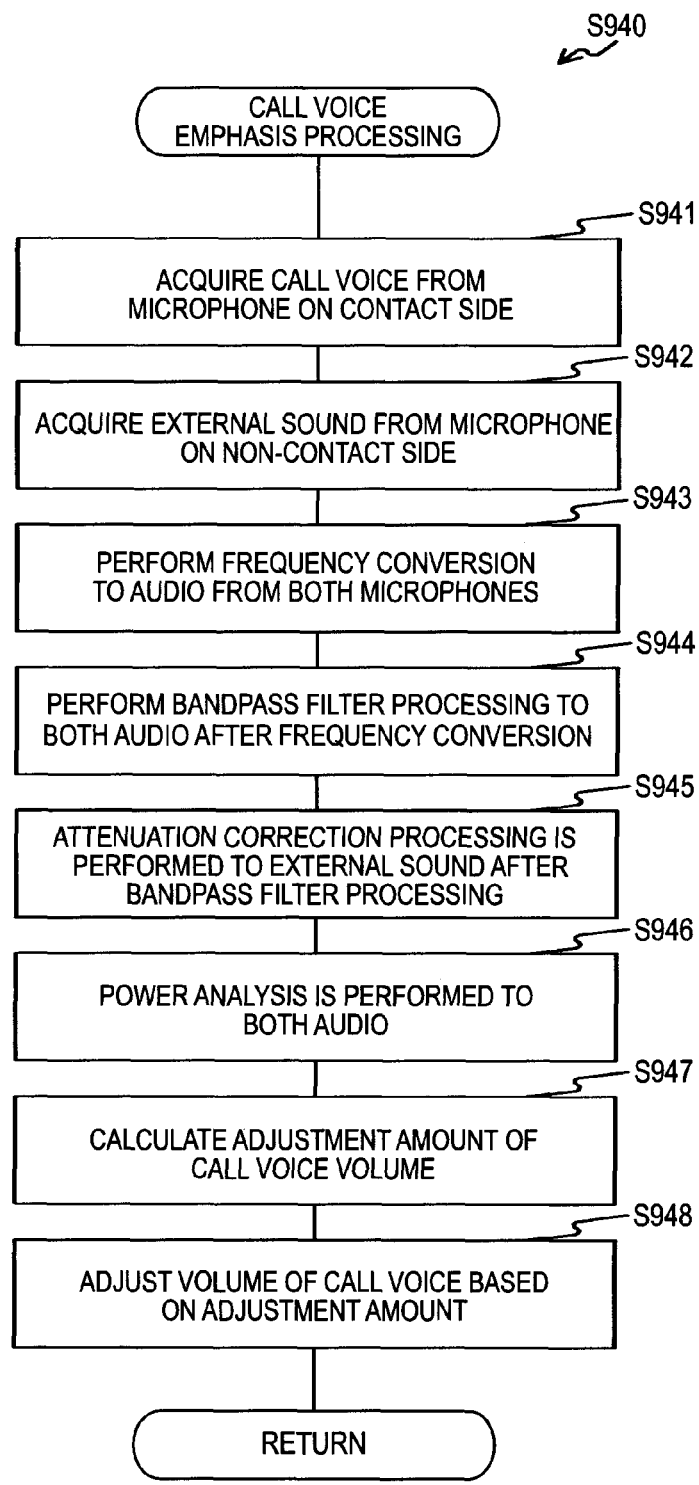
FIG. 12 is a flowchart showing an example of processing procedures of call voice emphasis processing by the call voice adjustment unit according to an embodiment of the invention.

FIG. 12 is a flowchart showing an example of processing procedures of the call voice emphasis processing (Step S940) by the call voice adjustment unit 400 according to the first embodiment of the invention.

First, the call voice signal is supplied from the speaker 161 or 162 on the side of the contact position notified by the contact determination unit 200 (Step S941). The external sound signal is supplied from the speaker 162 or 161 which is opposite to the contact position notified by the contact determination unit 200 (Step S942). Then, the call voice signal and the external sound signal supplied from the speakers 161, 162 are converted from the time domain to the frequency domain in the spectrum generating units 411, 412 to thereby generate spectrum information respectively (step S943).

Subsequently, bandpass filter processing is performed with respect to spectrum information of the call voice signal and the external sound signal by the filter processing units 421, 422 (Step S944). Then, attenuation correction processing is performed to the spectrum information of the external sound signal to which the bandpass filter processing has been performed by the filter processing unit 421 or 422 on the side of the contact position notified by the contact determination unit 200 (Step S945). After that, power analysis is performed with respect to the spectrum information concerning the external sound signal to which attenuation correction processing has been performed and the spectrum information concerning the call voice signal to which the bandpass filter processing has been performed, thereby generating respective power envelopes (Step S946).

Then, the adjustment amount with respect to the volume of the call voice signal is calculated by the volume adjustment amount decision unit 450 based on power values of respective frequency components of the voice call signal and the external sound signal from the power analysis units 441, 442 (Step S947). Subsequently, the volume of the call voice signal supplied from the audio signal generating unit 431 or 432 on the side of the contact position is adjusted by the volume adjustment unit 461 or 462 on the side of the contact position based on the adjustment amount decided by the volume adjustment amount decision unit 450 (Step S948). At this time, the external sound signal is outputted by the volume as it is from the volume adjustment unit 462 or 461 which is opposite to the contact position.

As described above, according to the first embodiment of the invention, the contact determination unit 200 is provided, thereby determining the occurrence of contact and the contact position with respect to the cellular phone 800 based on variations of pressure signals generated by the pressure sensors 121, 122. According to this, when the cellular phone 800 is pressed on the headphone device 100, call voice collected by the microphone 111 or 112 can be outputted from the speaker 161 or 162 on which the cellular phone 800 is pressed.

In the above description, the example of determining that the cellular phone 800 has been pressed on the headphone device 100 based on the magnitude of pressure generated between the cellular phone 800 and the impulsive noise absorbing material 131 or 132 has been described, however, it is not limited to this. For example, it is possible to determine whether the cellular phone 800 has been pressed or not by detecting level variations of audio signals generated by the microphones 111, 112 being covered by the cellular phone 800. Accordingly, an example of determining the occurrence of contact based on the level variations of the audio signals will be explained below with reference to the drawing.

Second Embodiment

[Outline View of the Headphone Device]

Figure 13:
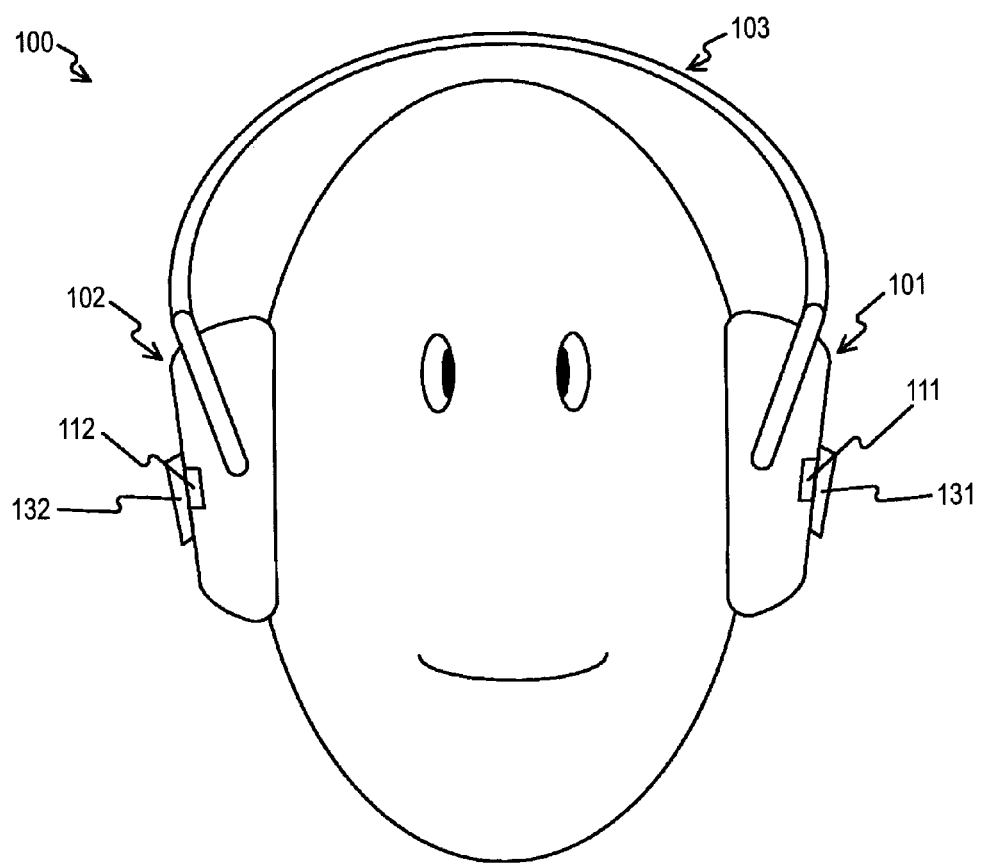
FIG. 13 is an outline view showing an example of the headphone device according to an embodiment of the invention.

FIG. 13 is an outline view showing an example of the headphone device 100 according to a second embodiment of the invention. In the headphone device 100, the pressure sensors 121, 122 shown in FIG. 1A are removed for determining the occurrence of contact with respect to the cellular phone 800 based on audio signals generated by the microphones 111, 112. The configuration of the headphone device 100 is the same as one shown in FIG. 1A, therefore, the same numerals are given and the explanation is omitted here.

[Configuration Example of the Headphone Device]

Figure 14:
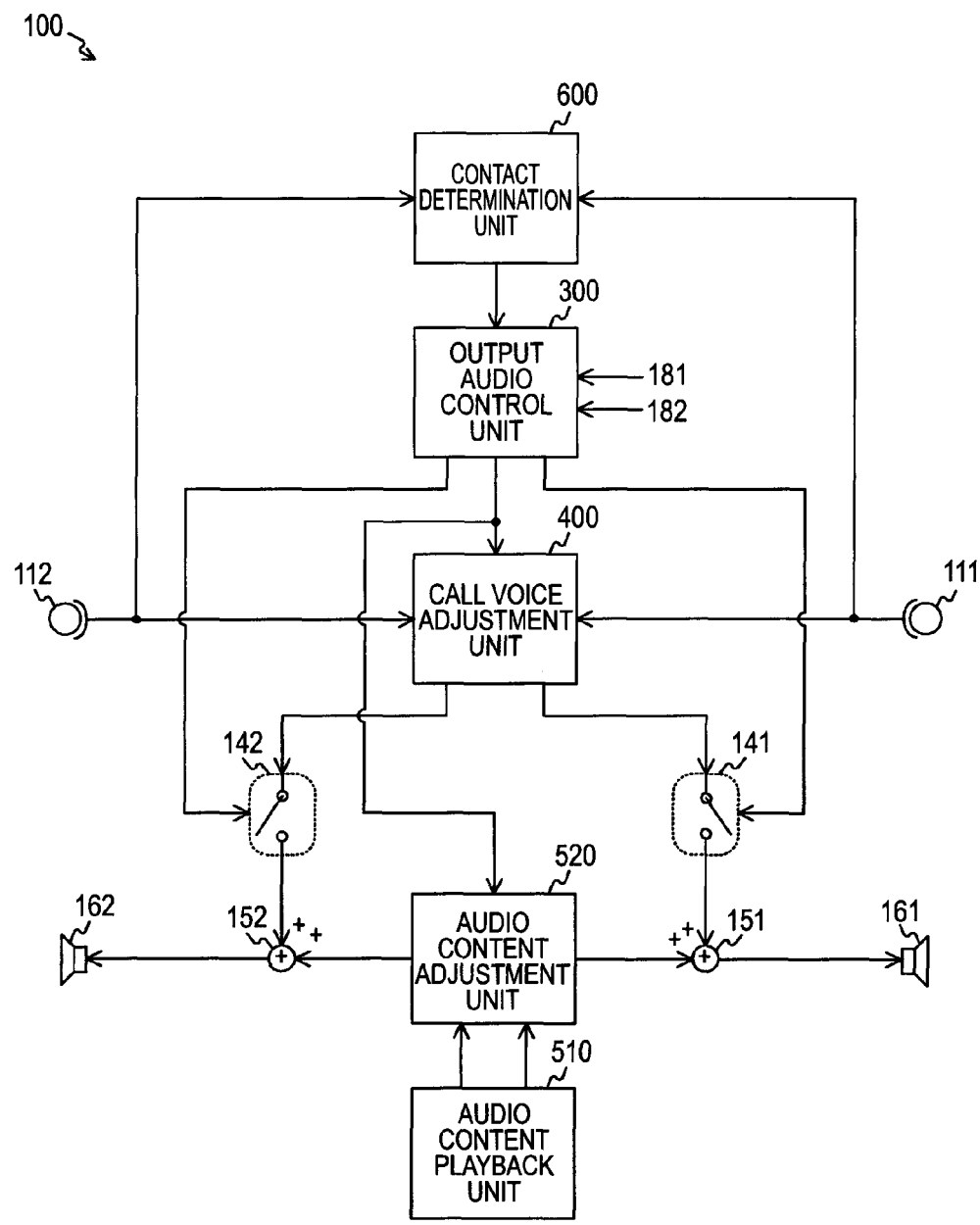
FIG. 14 is a block diagram showing a configuration example of the headphone device according to an embodiment of the invention.

FIG. 14 is a block diagram showing a configuration example of the headphone device 100 according to the second embodiment of the invention. Here, the headphone device 100 includes a contact determination unit 600 instead of the pressure sensors 121, 122 and the contact determination unit 200 shown in FIG. 1A and FIG. 2. In the example, audio signals generated by the microphones 111, 112 are supplied to the contact determination unit 600. Here, since components other than the contact determination unit 600 are the same as components of FIG. 2, the same numerals are given and the explanation will be omitted here.

The contact determination unit 600 determines the occurrence of contact by the cellular phone 800 based on the audio signals supplied from the microphones 111, 112. The contact determination unit 600 determines the occurrence of contact by the cellular phone 800 based on the level of the audio signals supplied from the microphones 111, 112. The contact determination unit 600 determines the occurrence of contact with respect to the cellular phone 800 based on, for example, sound pressure levels of audio signals supplied from the microphones 111, 112. This is because, when the microphone 111 or 112 is covered by the cellular phone 800, the sound pressure level of the audio signal generated by the covered microphone 111 or 112 is reduced. The contact determination unit 600 supplies the occurrence of contact and the contact position determined based on the level of the audio signals supplied from the microphones 111, 112 to the output audio control unit 300.

[Configuration Example of the Contact Determination Unit]

Figure 15:
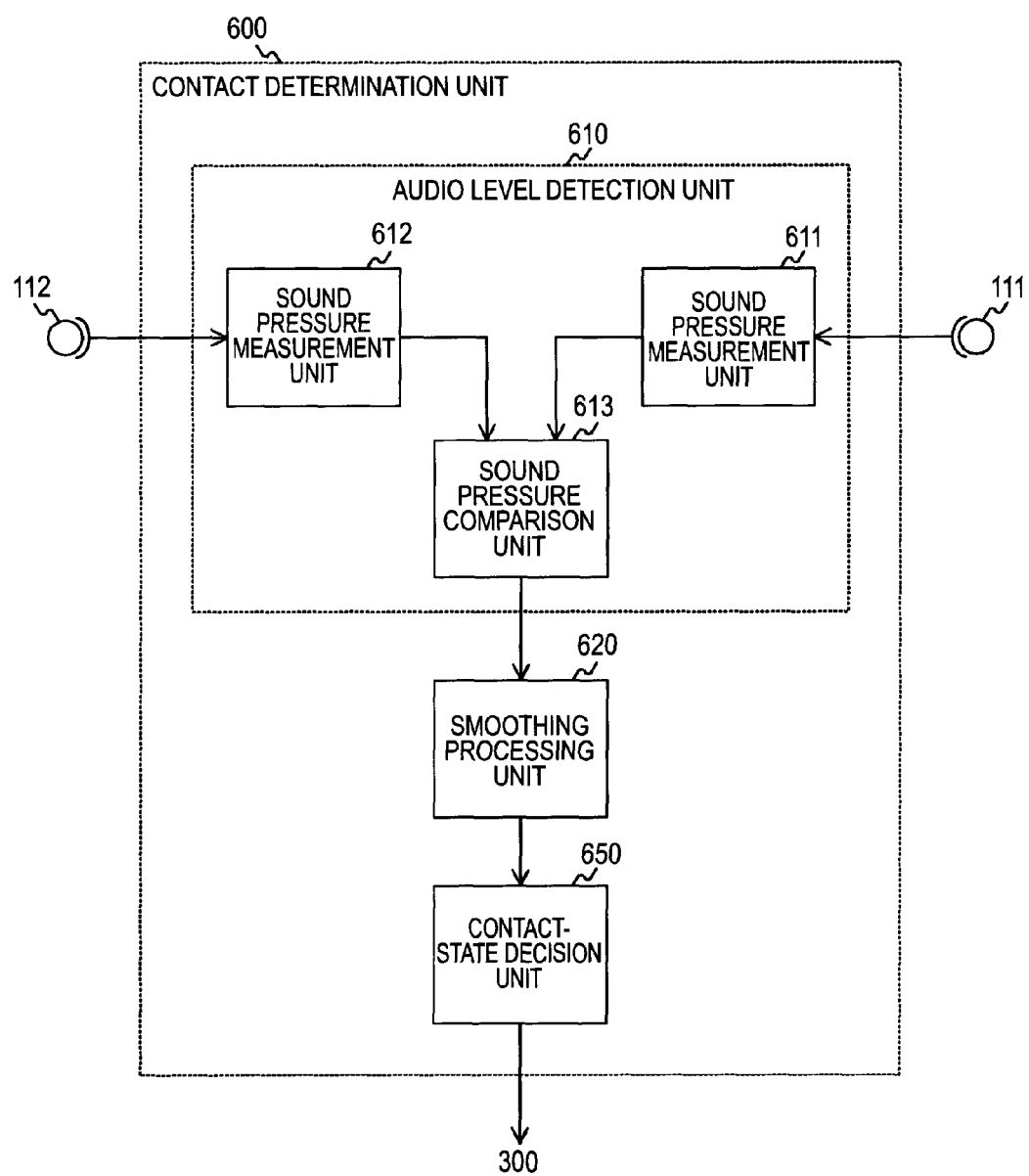
FIG. 15 is a block diagram showing a configuration example of a contact determination unit according to an embodiment of the invention.

FIG. 15 is a block diagram showing a configuration example of the contact determination unit 600 according to the second embodiment of the invention. In this case, the microphones 111, 112 and the contact determination unit 600 are shown. The contact determination unit 600 includes an audio level detection unit 610, a smoothing processing unit 620 and a contact-state decision unit 650. In this case, the microphones 111, 112 are the same as ones shown in FIG. 1A and FIG. 2 as well as the smoothing processing unit 620 and the contact-state decision unit 650 correspond to the smoothing processing unit 220 and the contact-state decision unit 250, therefore, the explanation will be omitted here.

The audio level detecting unit 610 detects sound pressure levels of audio signals generated by the microphones 111, 112 and determines the occurrence of contact by the cellular phone 800 based on the detected pressure levels. The audio level detecting unit 610 includes sound pressure measurement units 611, 612 and a sound pressure comparison unit 613. The audio level detection unit 610 is an example of a contact determination unit according to the embodiment of the invention.

The sound pressure measurement units 611, 612 measure levels of audio signals generated by the microphones 111, 112. That is, the sound pressure measurement unit 611 measures the sound pressure level of the audio signal generated by the microphone 111. The sound pressure measurement unit 612 measures the sound pressure level of the audio signal generated by the microphone 112. The sound pressure measurement units 611, 612 respectively supply the measured sound pressure levels to the sound pressure comparison unit 613.

The sound pressure comparison unit 613 determines the occurrence of contact by the cellular phone 800 based on the sound pressure levels supplied from the sound pressure measurement units 611, 612. The sound pressure comparison unit 613 determines the occurrence of contact by the cellular phone 800 based on the level difference between the sound pressure levels from the sound pressure measurement units 611, 612. In the example, the sound pressure comparison unit 613 determines the occurrence of contact by the cellular phone 800 when the level difference between sound pressure levels from the sound pressure measurement units 611, 612 exceeds a fixed sound pressure difference threshold. As another example, the sound pressure comparison unit 613 determines that contact by the cellular phone 800 has occurred when any of the sound pressure levels of the microphones 111, 112 exceeds a fixed sound pressure level threshold. When it is determined that the contact has occurred, the sound pressure comparison unit 613 determines from which sound pressure measurement unit 611 or 612 the sound pressure level exceeding the sound pressure level threshold has been supplied, thereby specifying the contact position with respect to the cellular phone 800.

The sound pressure comparison unit 613 generates detection information indicating the occurrence of contact by the cellular phone 800 and the contact position when it is determined that the contact has occurred based on sound pressure levels supplied from the sound pressure measurement units 611, 612 respectively. For example, the sound pressure comparison unit 613 outputs "0" as detection information when the sound pressure comparison unit 613 determines that contact by the cellular phone 800 has not occurred. On the other hand, the sound pressure comparison unit 613 generates "1" as detection information when it is determined that contact by the cellular phone 800 has occurred on the side of the casing 101, and generates "−1" when it is determined that contact by the cellular phone 800 has occurred on the side of the casing 102. The sound pressure comparison unit 613 also outputs the generated detection information to the smoothing processing unit 620.

As described above, it is possible to determine the occurrence of contact by the cellular phone 800 based on the pressure sound levels of audio signals supplied from the microphones 111, 112 by providing the audio level detection unit 610. In this case, the example of detecting sound pressure levels of audio signals generated by the microphones 111, 112 has been explained, however, it is not limited to this. For example, when the microphone 111 or 112 is covered by the cellular phone 800, power values of the audio signal generated by the covered microphone 111, 112 in the high-frequency band largely varies. Therefore, it is also possible to detect the occurrence of contact with respect to the cellular phone 800 by detecting variations of power values of the audio signals generated by the microphones 111, 112 in the high frequency band. Accordingly, the configuration of detecting variations of power values of the audio signals generated by the microphones 111, 112 in the high frequency band will be explained below with reference to the drawing.

[Modification Example of the Contact Determination Unit]

Figure 16:
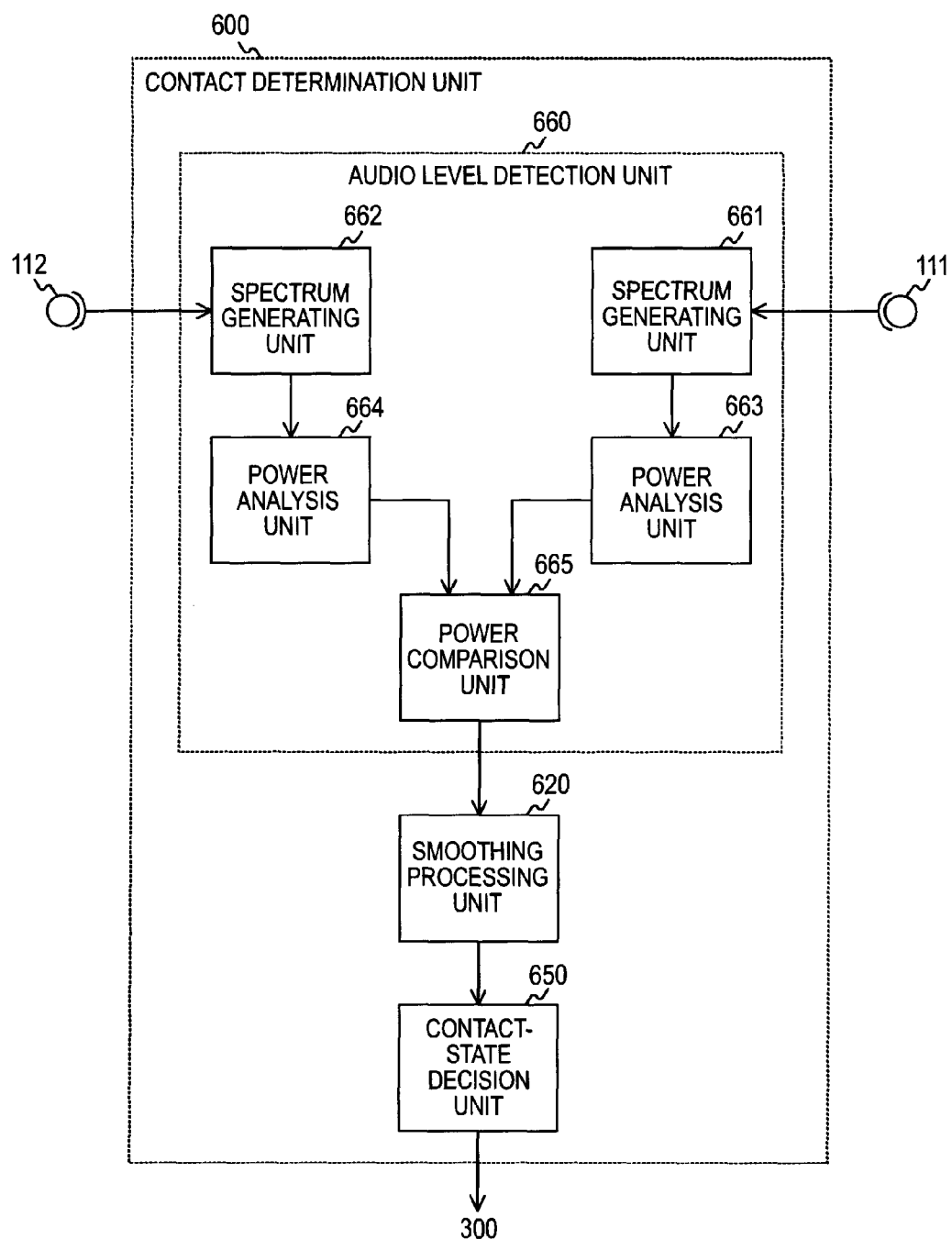
FIG. 16 is a block diagram showing a modification example of the configuration of the contact determination unit according to an embodiment of the invention.

FIG. 16 is a block diagram showing a modification example of the configuration of the contact determination unit 600 according to the second embodiment of the invention. In this case, the occurrence of contact with respect to the cellular phone 800 is assumed to be determined by detecting variations of power values of the audio signals in the high frequency band, which are generated by the microphones 111 or 112 being covered by the cellular phone 800. The contact determination unit 600 includes an audio level detection unit 660 instead of the audio level detection unit 610 shown in FIG. 15. In this example, components other than the audio level detection unit 660 are the same as components shown in FIG. 15, therefore, the same numerals are given and the explanation is omitted here.

The audio level detection unit 660 detects the spectrum level of the audio signal generated by the microphone 111 or 112 and determines the occurrence of contact by the cellular phone 800 based on the detected spectrum level. The audio level detection unit 660 includes spectrum generating units 661, 662, power analysis units 663, 664 and a power comparison unit 665. The audio level detection unit 660 is an example of the contact determination unit according to the embodiment of the invention.

The spectrum generating unit 661, 662 generate spectrum information by conversing audio signals supplied from the microphones 111, 112 from the time domain into the frequency domain. That is, the spectrum generating unit 661 generates spectrum information based on the audio signal from the microphone 111. The spectrum generating unit 662 generates spectrum information based on the audio signal from the microphone 112.

The spectrum generating units 661, 662 generate spectrum information by using, for example, Fast Fourier Transform (FFT) or octave division. The spectrum generating units 661, 662 also supply the generated spectrum information to the power analysis units 663, 664 respectively.

The power analysis units 663, 664 perform power analysis based on the spectrum information generated by the spectrum generating units 661, 662. That is, the power analysis unit 663 performs power analysis based on spectrum information generated by the spectrum generating unit 661. The power analysis unit 664 performs power analysis based on spectrum information generated by the spectrum generating unit 662.

The power analysis units 663, 664 generate power envelopes based on the spectrum information from the spectrum generating units 661, 662. That is, the power analysis units 663, 664 calculate power values of respective frequency components based on the spectrum information from the spectrum generating units 661, 662. The power analysis units 663, 664 output the calculated power values of respective frequency components to the power comparison unit 665 respectively.

The power comparison unit 665 determines the occurrence of contact with respect to the cellular phone 800 based on the power envelopes respectively supplied from the power analysis units 663, 664. The power comparison unit 665 determines the occurrence of contact based on power values of respective frequency components of power envelopes generated by the power analysis units 663, 664 in the high frequency band. That is, the power comparison unit 665 determines the occurrence of contact with respect to the cellular phone 800 based on the spectrum levels of the audio signals generated by the microphones 111, 112 in the high frequency band.

The power comparison unit 665 determines the occurrence of contact based on spectrum levels in the frequency band higher than a voice band (350 Hz to 7 kHz). The power comparison unit 665 determines the occurrence of contact based on power values of respective frequency components in the frequency band higher than a frequency which is approximately ⅓ of the maximum frequency in frequency performance of the microphones 111, 112. That is, the power comparison unit 665 determines the occurrence of contact based on the spectrum level in the frequency band higher than a frequency which is approximately ⅓ of the maximum frequency in the audio signals generated by the microphones 111, 112.

The power comparison unit 665 determines that contact by the cellular phone 800 has occurred when the power value of the spectrum at the high frequency band of the power envelope generated by the power analysis unit 663 or 664 exceeds a fixed power threshold. As another example, the power comparison unit 665 determines the occurrence of contact by comparing power values of high frequency components of both power envelops respectively generated by the power analysis units 663, 664 with each other. In the example, when the comparison result exceeds a fixed level difference, the power comparison unit 665 determines that contact has occurred, and specifies the contact position corresponding to the power analysis unit 663 or 664 which has larger power value.

The power comparison unit 665 also generates detection information indicating the occurrence of contact and the contact position when it is determined that contact has occurred based on power envelopes respectively supplied from the power analysis units 663, 664. The power comparison unit 665 outputs "0" as detection information when it is determined that contact by the cellular phone 800 has not occurred. The power comparison unit 665 generates "1" when it is determined that contact by the cellular phone 800 has occurred on the side of the casing 101, and generates "−1" as detection information when it is determined that contact by the cellular phone 800 has occurred on the side of the casing 102. The power comparison unit 665 outputs the generated detection information to the smoothing processing unit 620. The power comparison unit 665 is an example of the contact determination unit according to the embodiment of the invention.

As described above, it is possible to determine the occurrence of contact with respect to the cellular phone 800 based on the spectrum levels of audio signals generated by the microphones 111, 112 in the high frequency band by providing the audio level detection unit 660.

According to the second embodiment of the invention, the occurrence of contact with respect to the cellular phone 800 can be determined by detecting variations of levels of audio signals generated by microphones 111, 112 by providing the audio level detection unit 610 or 660. According to this, it is possible to determine the occurrence of contact by the cellular phone 800 without providing the pressure sensor 121 or 122 at the casing 101 or 102, which is different from the first embodiment of the invention. The first and second embodiments of the invention can be applied to a headphone device having a noise cancelling function. Accordingly, a headphone device to which the first embodiment of the invention is applied will be briefly explained below with reference to the drawing as a third embodiment.

Third Embodiment

[Configuration Example of the Headphone Device]

Figure 17:
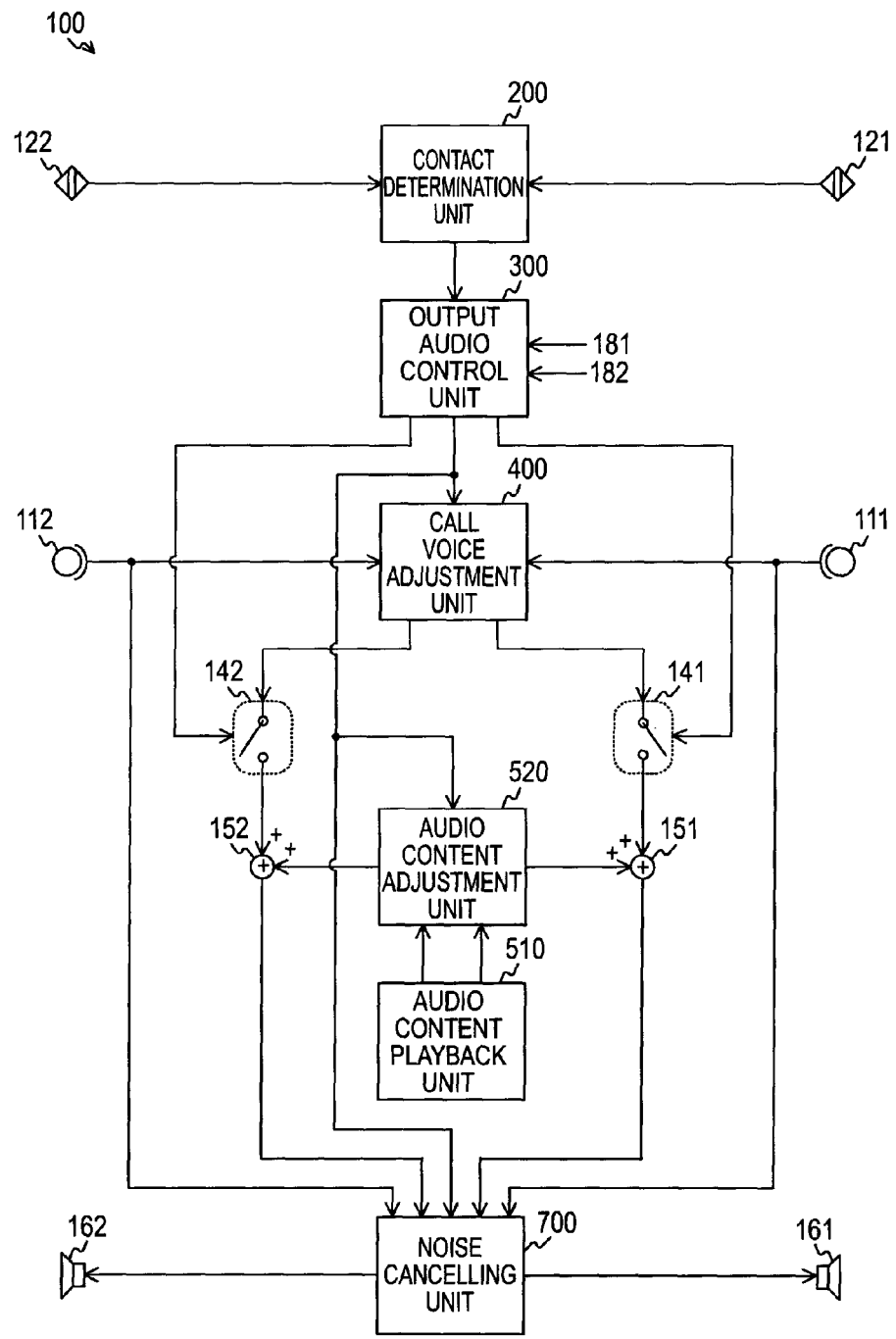
FIG. 17 is a block diagram showing a configuration example of the headphone device according to an embodiment of the invention.

FIG. 17 is a block diagram showing a configuration example of the headphone device 100 according to a third embodiment of the invention. The headphone device 100 further includes a noise cancelling unit 700 in addition to the components of the headphone device 100 shown in FIG. 2. In the example, audio signals generated by the microphones 111, 112 and audio signals generated by the synthesizing units 151, 152 are supplied to the noise cancelling unit 700. A designation of the contact position is notified from the output audio control unit 300 to the noise cancelling unit 700 based on the determined result by the contact determination unit 200. In this case, since components other than the noise cancelling unit 700 are the same as components shown in FIG. 2, the same numerals are given and the explanation is omitted here.

The noise cancelling unit 700 performs noise cancelling processing for cancelling noise components by external sound with respect to audio signals to be supplied to the speakers 161, 162 based on external sound signals generated by the microphones 111, 112. That is, the noise cancelling unit 700 includes a so-called noise cancelling function. The noise cancelling unit 700 estimates noise components, for example, based on the external sound signals from the microphone 111 to thereby perform noise cancelling processing on audio signals to be supplied to the speaker 161 for removing the estimated noise components. The noise cancelling unit 700 estimates noise components based on the external sound signal generated by the microphone 112 to perform noise cancelling processing on audio signals to be supplied to the speaker 162.

When the contact position is notified from the output audio control unit 300, the noise cancelling unit 700 uses the external sound signal from the speaker 162 or 161 which is opposite to the contact position for performing noise cancelling processing on the call voice signal to be supplied to the speaker 161 or 162 on the side of the contact position. For example, when the contact to the casing 101 is notified from the output audio control unit 300, the noise cancelling unit 700 performs noise cancelling processing on the call voice signal to be outputted to the speaker 161 on the side of the casing 101 based on the external sound signal generated from the speaker 162 which is opposite to the casing 101. At this time, when only the audio content signal the volume of which is reduced to a fixed level is supplied to the speaker 162, the noise cancelling unit 700 performs noise cancelling processing on the audio content signal based on the external sound signal from the microphone 112. The noise cancelling unit 700 supplies the audio signals to which the noise cancelling processing has been respectively performed to the speakers 161, 162.

As described above, the noise cancelling processing can be performed on the call voice signal based on the external sound signal generated by the microphone 111 or 112 which is opposite to the contact position by providing the noise cancelling unit 700 even when communication is performed by the cellular phone 800. Accordingly, the listener can listen to call voice from which noise components due to external sound have been removed, therefore, the listener can listen to call voice from the cellular phone 800 clearly. In this case, the example in which noise components with respect to call voice outputted from the speaker 161 or 162 are estimated based on the external sound signal from the microphone 112 or 111 which is opposite to the contact position has been explained, however, it is not limited to this. For example, it is also preferable that the auxiliary microphone 171 or 172 as shown in FIG. 9 is provided and noise components with respect to the call voice are estimated based on the external sound signal generated by the auxiliary microphone 171 or 172.

As described above, according to the embodiments of the invention, the listener can talk by the cellular phone 800 without removing the headphone 100 even when receiving a call by the cellular phone 800.

The example in which the contact state by the cellular phone 800 is detected by using the pressure sensors 121, 122 or the microphone 111, 112 has been shown in the embodiments of the invention, however, it is also preferable to determine the occurrence of contact by providing a radio-wave detector which detects radio waves of the cellular phone.

The embodiments of the invention are shown as examples for embodying the invention, having correspondence with respect to feature components of the invention in claims as described above. However, the invention is not limited to the embodiments and can be variously modified within a scope not departing from the gist of the invention.

The processing procedures explained in the embodiments of the invention can be regarded as a method having the series of procedures, and can be regarded as a program for allowing a computer to execute the series of procedures or a recording medium for storing the program. As recording media, for example, CD (Compact Disc), MD (Mini Disc), DVD (Digital Versatile Disc), memory cards, Blu-ray Disc (Trademark) and the like can be used.

The present application contains subject matter related to that disclosed in Japanese Priority Patent Application JP 2009-086902 filed in the Japan Patent Office on Mar. 31, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A headphone device comprising:
   two output units for outputting playback audio which has been played back;
   a contact determination unit determining the occurrence of contact between a telephone device and the headphone;
   a first audio-collecting unit for collecting call voice generated from a speaker of the telephone device during a call;
   a second audio-collecting unit for collecting ambient external sound; and
   an output audio control unit performing control so that the call voice is outputted from one output unit of the two output units and the external sound is outputted from the other output unit when it is determined that contact has occurred by the contact determination unit.

2. The headphone device according to claim 1,
   wherein the contact determination unit determines the occurrence of contact with respect to the telephone device based on a level of an audio signal generated by the first audio-collecting unit.

3. The headphone device according to claim 2,
   wherein the contact determination unit determines the occurrence of contact with respect to the telephone device based on a spectrum level of the audio signal generated by the first audio-collecting unit in a high frequency band.

4. The headphone device according to claim 3,
wherein the contact determination unit determines the occurrence of contact with respect to the telephone device based on the spectrum level in the high frequency band higher than a frequency which is approximately ⅓ of the maximum frequency in the audio signal generated by the first audio-collecting unit.

5. The headphone device according to claim 3,
wherein the contact determination unit determines the occurrence of contact with respect to the telephone device based on the spectrum level in the high frequency band which is higher than a voice band.

6. The headphone device according to claim 2,
wherein the contact determination unit determines the occurrence of contact with respect to the telephone device based on a sound pressure level of the audio signal generated by the first audio-collecting unit.

7. The headphone device according to claim 1, further comprising:
pressure sensors detecting pressure generated by contact with respect to the telephone device,
wherein the contact determination unit specifies the first audio-collecting unit in the first and second audio-collecting units based on magnitude of pressure respectively detected by the given pressure sensors when it is determined that contact has occurred, and
the output audio control unit performs control so that the call voice collected by the first audio-collecting unit specified by the contact determination unit is outputted from one output unit and the external sound is outputted from the other output unit.

8. The headphone device according to claim 1, further comprising:
a call voice adjustment unit adjusting an output level of a call voice signal based on level difference between the call voice signal generated by the first audio-collecting unit and an external sound signal generated by the second audio-collecting unit, and supplying an adjusted call voice signal to one output unit.

9. The headphone device according to claim 8,
wherein the call voice adjustment unit adjusts the output level of the call voice signal based on the level difference between a spectrum level in the maximum frequency at which a spectrum of the call voice signal becomes maximum and a spectrum level of a frequency component of the external signal corresponding to the maximum frequency.

10. The headphone device according to claim 8,
wherein the call voice adjustment unit supplies a new external sound signal to the other output unit, which is generated based on the external sound signal and given attenuation characteristics.

11. The headphone device according to claim 1,
wherein the output audio control unit performs control so that synthesized audio obtained by synthesizing the playback audio with the call voice set to predetermined levels is outputted from one output unit.

12. The headphone device according to claim 1,
wherein the output audio control unit performs control so that synthesized audio obtained by synthesizing the call voice with the external sound is outputted from one output unit.

13. The headphone device according to claim 1,
wherein the second audio-collecting unit includes plural audio-collecting devices collecting the ambient external sound.

14. An output control method of call voice in a headphone device including two output units for outputting playback audio which has been played back, a first audio-collecting unit for collecting call voice generated from a speaker of a telephone device during a call and a second audio-collecting unit for collecting ambient external sound, the method comprising the steps of:
determining occurrence of contact between the telephone device and the headphone; and
performing control so that the call voice is outputted from one output unit of the two output units and the external sound is outputted from the other output unit when it is determined that contact has occurred.

15. A non-transitory computer readable medium embedding a program, which when executed by at least one processor, causes the processor to perform operations in a headphone device including two output units for outputting playback audio which has been played back, a first audio-collecting unit for collecting call voice generated from a speaker of a telephone device during a call and a second audio-collecting unit for collecting ambient external sound, the operations comprising:
determining occurrence of contact between to the telephone device and the headphone; and
performing control so that the call voice is outputted from one output unit of the two output units and the external sound is outputted from the other output unit when it is determined that contact has occurred.

* * * * *